(12) United States Patent
Matsen et al.

(10) Patent No.: US 9,090,043 B2
(45) Date of Patent: Jul. 28, 2015

(54) MOLYBDENUM COMPOSITE HYBRID LAMINATES AND METHODS

(75) Inventors: Marc R. Matsen, Seattle, WA (US); Mark A. Negley, Bellevue, WA (US); Marc J. Piehl, Renton, WA (US); Kay Y. Blohowiak, Issaquah, WA (US); Alan E. Landmann, Woodinville, WA (US); Richard H. Bossi, Renton, WA (US); Robert L. Carlsen, Kent, WA (US); Gregory Alan Foltz, Seattle, WA (US); Geoffrey A. Butler, Seattle, WA (US); Liam S. Cavanaugh Pingree, Seattle, WA (US); Stephen G. Moore, Renton, WA (US); John Mark Gardner, Newcastle, WA (US); Robert A. Anderson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 961 days.

(21) Appl. No.: 13/197,750

(22) Filed: Aug. 3, 2011

(65) Prior Publication Data
US 2013/0034705 A1 Feb. 7, 2013

(51) Int. Cl.
*B32B 7/00* (2006.01)
*B32B 3/14* (2006.01)
*B32B 15/08* (2006.01)
(Continued)

(52) U.S. Cl.
CPC ... *B32B 7/12* (2013.01); *B32B 3/06* (2013.01); *B32B 15/00* (2013.01); *B32B 15/08* (2013.01); *B32B 19/02* (2013.01); *B32B 27/00* (2013.01); *B32B 2250/42* (2013.01); *B32B 2260/021* (2013.01); *B32B 2405/00* (2013.01); *B32B 2605/18* (2013.01); *Y10T 29/49208* (2015.01);
(Continued)

(58) Field of Classification Search
CPC .............. B32B 3/00; B32B 3/10; B32B 3/14; B32B 3/18; B32B 15/00; B32B 15/08; B32B 15/04; B32B 15/14; B64C 3/26; B64C 1/12
USPC ......... 428/49, 77, 78, 61, 189, 457, 608, 593; 244/131, 133
See application file for complete search history.

(56) References Cited

U.S. PATENT DOCUMENTS 5,160,771 A 11/1992 Lambing et al.
5,427,304 A 6/1995 Woods et al.
(Continued)

FOREIGN PATENT DOCUMENTS

GB 841217 A 7/1960
GB 1012621 A 12/1965
(Continued)

OTHER PUBLICATIONS

PCT International Search Report and Written Opinion of the International Searching Authority, Sep. 3, 2012, for corresponding International Application No. PCT/US2012/044459 of The Boeing Company, 9 pages.

*Primary Examiner* — Catherine A Simone

(57) ABSTRACT

In an embodiment of the disclosure, there is provided a molybdenum composite hybrid laminate. The laminate has a plurality of composite material layers. The laminate further has a plurality of surface treated molybdenum foil layers interweaved between the composite material layers. The laminate further has a plurality of adhesive layers disposed between and bonding adjacent layers of the composite material layers and the molybdenum foil layers.

25 Claims, 24 Drawing Sheets

(51) Int. Cl.
 *B32B 3/00* (2006.01)
 *B32B 7/12* (2006.01)
 *B32B 15/00* (2006.01)
 *B32B 19/02* (2006.01)
 *B32B 27/00* (2006.01)
 *B32B 3/06* (2006.01)

(52) U.S. Cl.
 CPC .......... *Y10T 29/49885* (2015.01); *Y10T 156/10* (2015.01); *Y10T 428/24752* (2015.01)

(56) References Cited

U.S. PATENT DOCUMENTS

| | | | |
|---|---|---|---|
| 5,553,455 A | 9/1996 | Craig et al. | |
| 5,693,157 A * | 12/1997 | Kingston | 148/537 |
| 5,866,272 A | 2/1999 | Westre et al. | |
| 5,939,213 A | 8/1999 | Bowden et al. | |
| 6,037,060 A | 3/2000 | Blohowiak et al. | |
| 6,114,050 A | 9/2000 | Westre et al. | |
| 6,824,880 B1 | 11/2004 | Admasu et al. | |
| 7,115,323 B2 | 10/2006 | Westre et al. | |
| 7,491,289 B2 | 2/2009 | Westre et al. | |
| 7,968,169 B2 | 6/2011 | Gleason et al. | |
| 2004/0209106 A1 | 10/2004 | Gales et al. | |

FOREIGN PATENT DOCUMENTS

| | | |
|---|---|---|
| JP | 6206279 A | 7/1994 |
| JP | 2006082370 A | 3/2006 |
| JP | 2008230096 A | 10/2008 |

\* cited by examiner

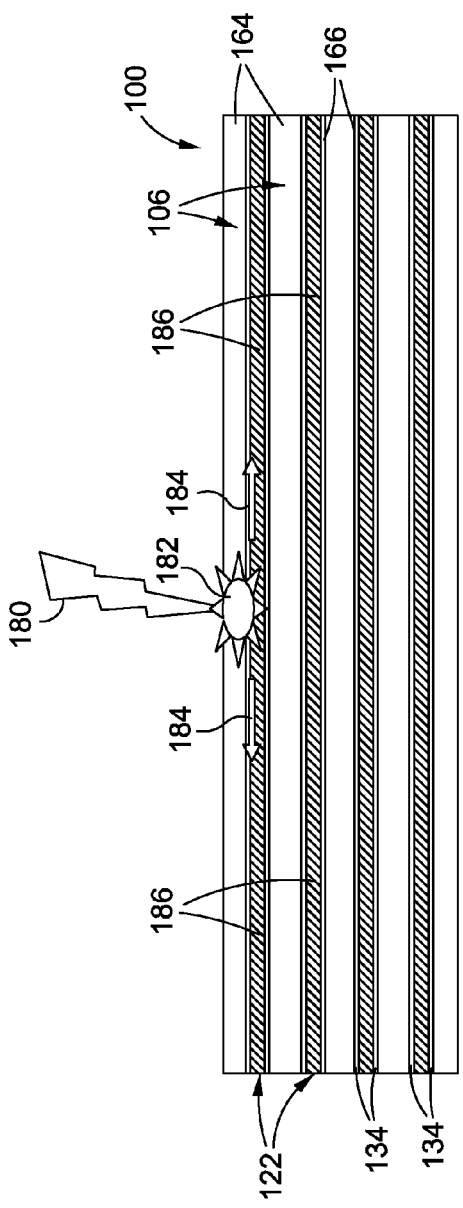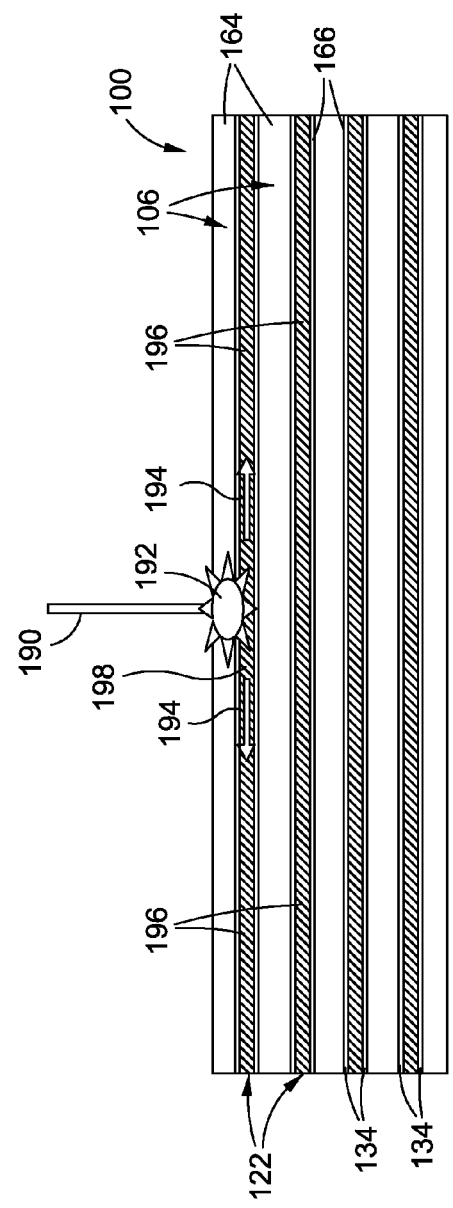

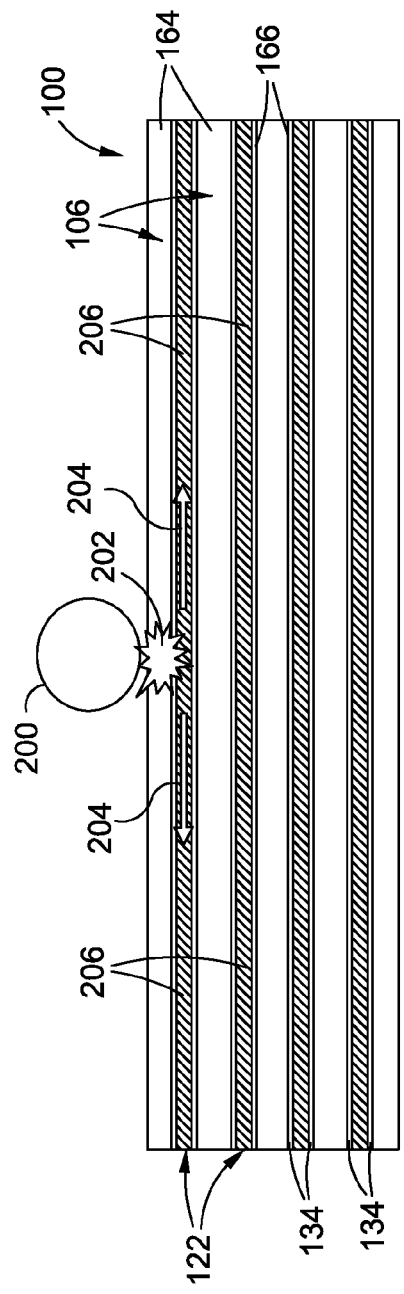
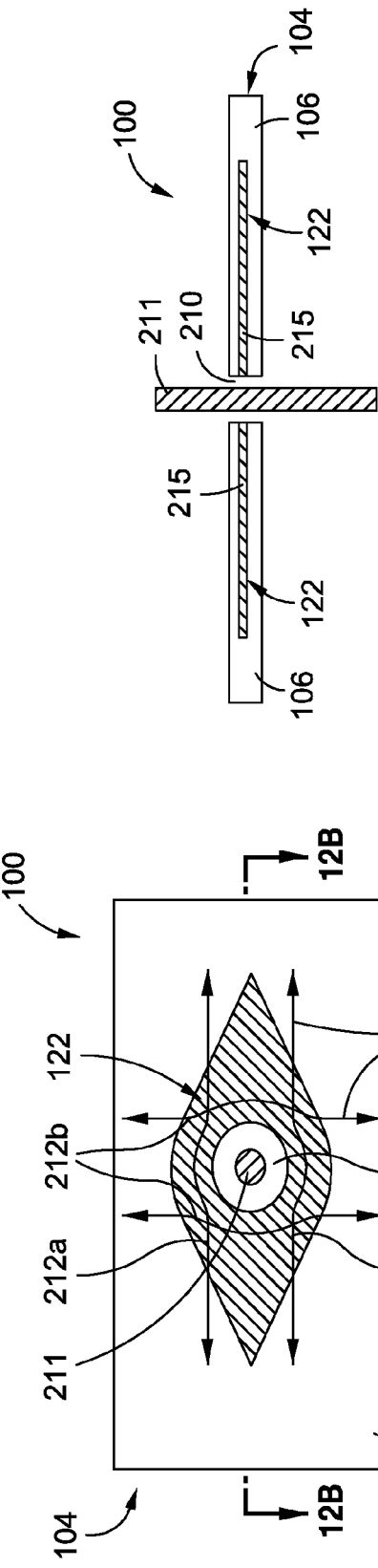

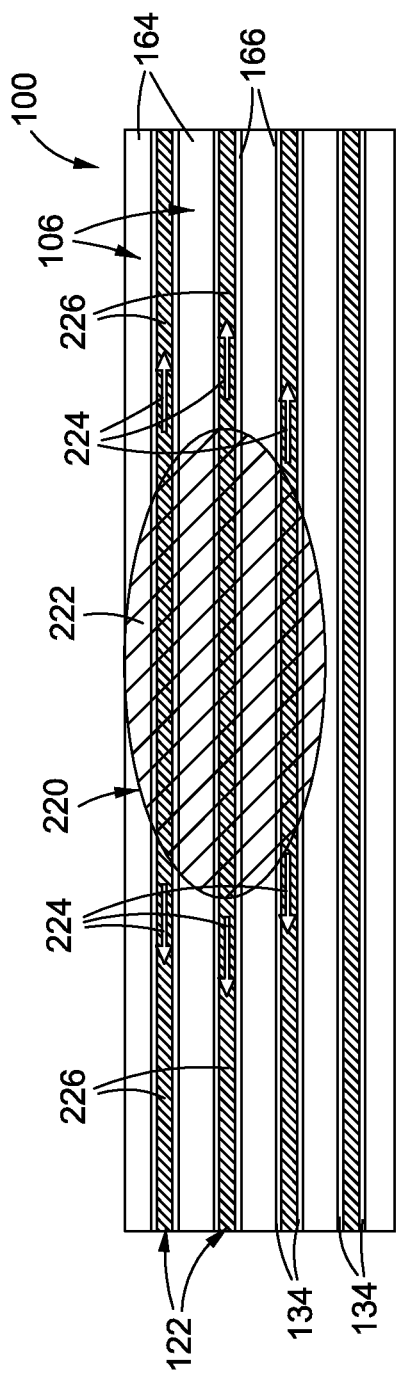
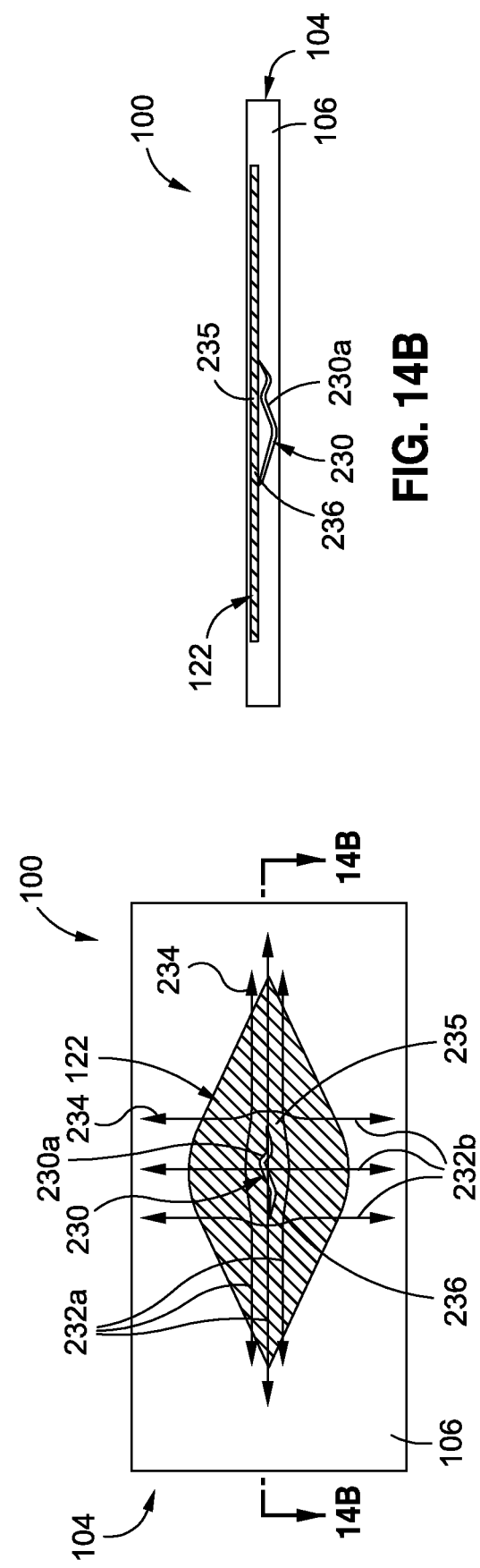
FIG. 13
FIG. 14A
FIG. 14B

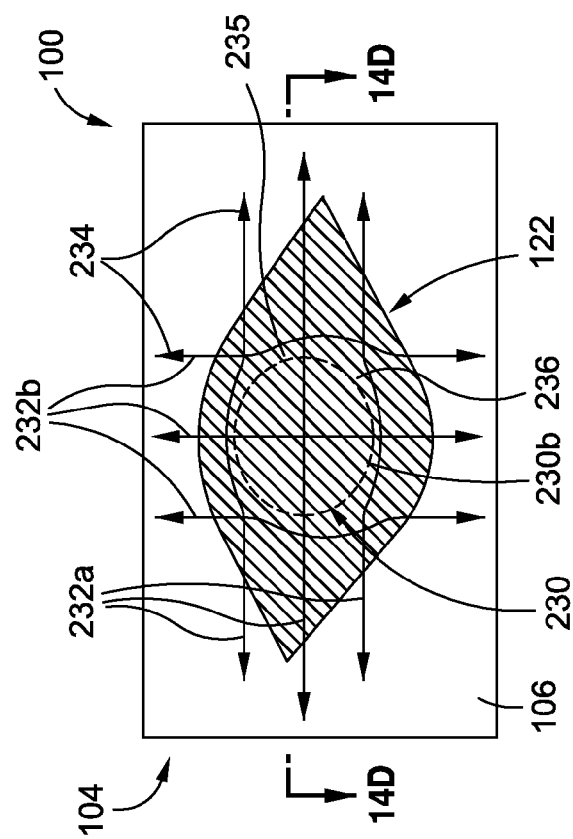
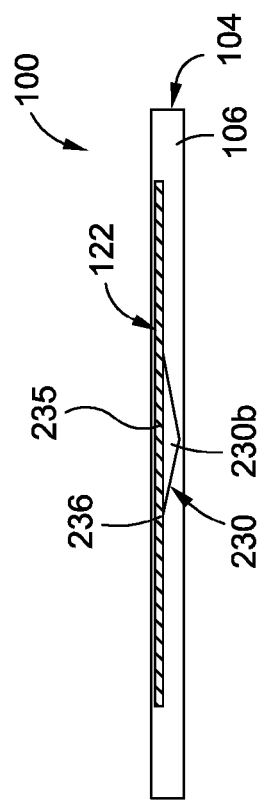
FIG. 14C
FIG. 14D

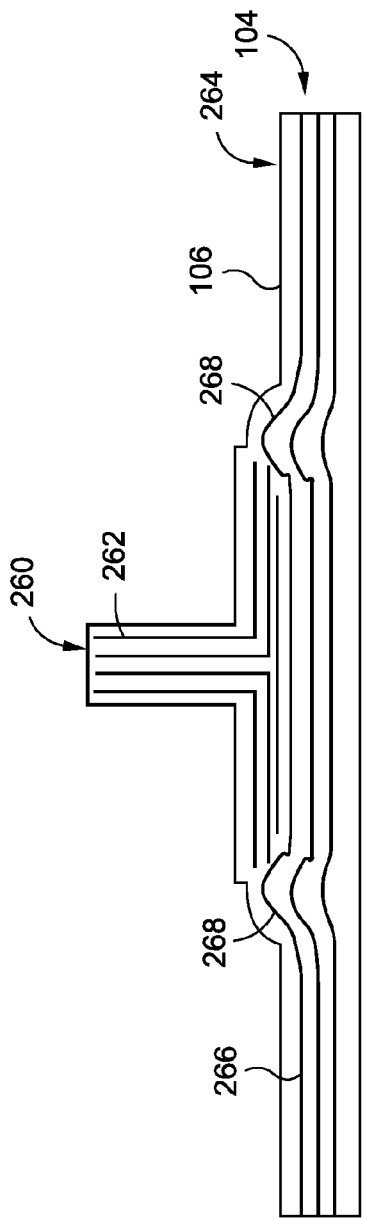
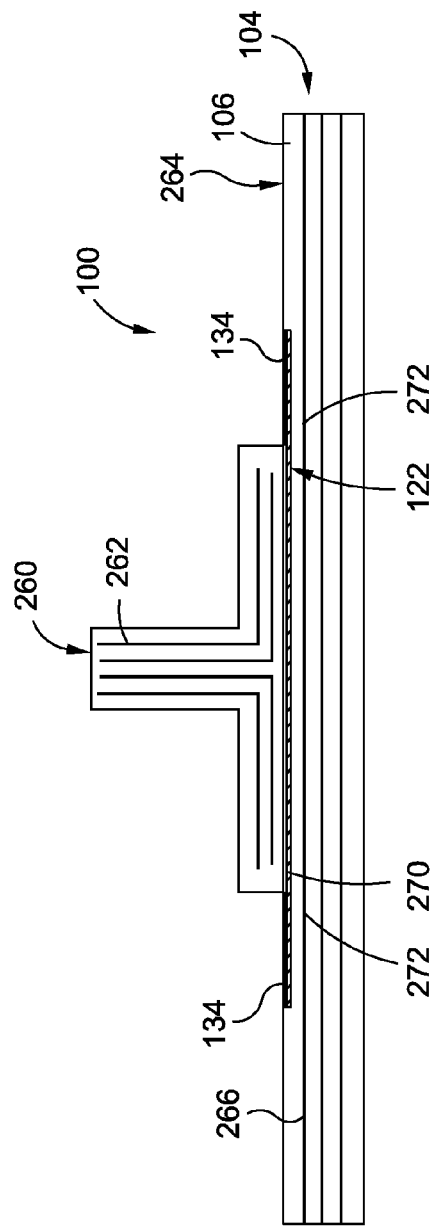

MOLYBDENUM COMPOSITE HYBRID LAMINATES AND METHODS

REFERENCE TO GOVERNMENT CONTRACT

This invention was made with Government support under Contract No. HR0011-10-2-0001 awarded by Defense Advanced Research Program Agency (DARPA) Defense Science Office and the United States Navy. The government has certain rights in the invention.

BACKGROUND

1) Field of the Disclosure

The disclosure relates generally to composite materials and methods, and more particularly, to hybrid composite laminates and methods for use in composite structures, such as aircraft, spacecraft, and other vehicles.

2) Description of Related Art

Composite structures and component parts are used in a wide variety of applications, including in the manufacture of aircraft, spacecraft, rotorcraft, watercraft, automobiles, trucks, and other vehicles. In particular, in aircraft construction, composite structures and component parts are used in increasing quantities to form the fuselage, wings, tail section, skin panels, and other component parts of the aircraft.

Known methods exist for fabricating hybrid laminates that combine polymeric composite materials, such as graphite, boron, or a blend of graphite and boron composite, and metal foil materials, such as, titanium. The metal foil material may be added between laid up plies of polymeric composite unidirectional tape. For example, U.S. Pat. No. 5,866,272 to Westre et al., incorporated by this reference, is one of several patents teaching the placement of titanium foil between plies of polymeric composite unidirectional tape.

However, known composite and hybrid laminate materials can only leverage the strengthening fibers that are in the load path and do not leverage the strength of off-axis fibers. Moreover, known composite and hybrid laminate materials may not be effective at providing a current dissipation path in the composite structure, for example, for effective lightning strike protection. In addition, known composite and hybrid laminate materials may not provide effective impact resistance from high impact sources, such as hail or bird strikes, without having to change the structure by cross stitching or increasing the thickness of the composite structure, to name a few methods. Further, known composite and hybrid laminate materials may not provide effective thermal impingement resistance from high energy thermal impingement sources, such as lasers and X-rays. In addition, known composite and hybrid laminate materials may not provide the ability to combine separate structural and electrical systems into a single system on an aircraft.

Moreover, lightweight composite designs, such as for keel beams in aircraft, may require additional structurally parasitic conductors to effectively disperse the current from a lightning strike. Such additional conductors can add weight to the aircraft, and can result in increased fuel costs and overall costs. Known composite and hybrid laminate materials may not provide the desired lightweight, high performing composite keel beam that may be effective in conducting current and acting as a lightning strike current return path.

In addition, when system penetrations, access paths, and other non-load bearing areas are needed in composite or hybrid composite panels or structures, it may be necessary to pad-up the lay-up to facilitate the transmission of load around these areas. Known composite and hybrid laminate materials may be utilized to provide extra thickness which may result in additional cost, part volume and weight to the composite structure.

Moreover, thermal and temperature uniformity and the ability to control excessive thermal energy due to cure kinetics of the resins are important fabrication issues when curing thermosetting composites. Thermal and temperature control of the curing cycle may preclude the use of some composite configurations.

Further, repair areas of composite structures may need a significant increase in thickness of the composite structure to restore the composite structure to at least its original strength. This may cause additional aerodynamic drag and may also affect the appearance of the composite structure.

Further, during fabrication of composite parts, the plies of an uncured composite part having a uniform cross section may wrinkle at one or more areas where a cured or pre-cured composite part having a non-uniform cross section is joined to the uncured composite part. Such wrinkling of the plies may be due to differences in pressure between the cured or pre-cured composite part and the uncured composite part at the joined areas. Such wrinkling of the plies may result in fiber distortion of the composite material in the uncured composite part.

Finally, determination of initiation and propagation of flaws in composite structures is important in predicting service life and maintenance of the composite structure. Known composite and hybrid laminate structures are typically replaced or repaired at certain intervals. Such intervals are by their nature conservative, which may lead to additional, potentially unnecessary, cost accrual.

Accordingly, there is a need in the art for hybrid composite laminates and methods that provide advantages over known composite materials and known hybrid composite laminates and methods.

SUMMARY

This need for hybrid composite laminates and methods is satisfied. As discussed in the below detailed description, embodiments of the molybdenum composite hybrid laminates and methods may provide significant advantages over existing laminate materials, methods, and systems.

In an embodiment of the disclosure, there is provided a molybdenum composite hybrid laminate. The laminate comprises a plurality of composite material layers. The laminate further comprises a plurality of surface treated molybdenum foil layers interweaved between the composite material layers. The laminate further comprises a plurality of adhesive layers disposed between and bonding adjacent layers of the composite material layers and the molybdenum foil layers.

In another embodiment of the disclosure, there is provided a molybdenum laminate lay up. The molybdenum laminate lay up comprises a plurality of composite material layers. The molybdenum laminate lay up further comprises a plurality of molybdenum foil containing layers interweaved between the composite material layers. Each molybdenum foil containing layer comprises a composite material layer having a cutout portion of a surface treated molybdenum foil. The molybdenum laminate lay up further comprises a plurality of adhesive layers disposed between and bonding adjacent layers of the composite material layers and the molybdenum foil containing layers.

In another embodiment of the disclosure, there is provided a method of forming a molybdenum composite hybrid laminate. The method comprises treating a surface of each of a plurality of molybdenum foil layers. The method further comprises interweaving the surface treated molybdenum foil layers with a plurality of composite material layers. The method further comprises bonding with an adhesive layer each of the surface treated molybdenum foil layers to adjacent composite material layers to form a molybdenum composite hybrid laminate having improved yield strength.

In another embodiment of the disclosure, there is provided a system for monitoring structural health of a composite structure. The system comprises a composite structure comprising one or more molybdenum composite hybrid laminates. Each laminate comprises a plurality of composite material layers. The laminate further comprises a plurality of surface treated molybdenum foil layers interweaved between the composite material layers. The laminate further comprises a plurality of adhesive layers disposed between and bonding adjacent layers of the composite material layers and the molybdenum foil layers. The system further comprises one or more electrical sensor devices coupled to the one or more laminates. The sensor devices drive electrical current through the molybdenum foil layers and monitor any changes in flow of the electrical current through the molybdenum foil layers in order to obtain structural health data of the composite structure via one or more signals from the one or more electrical sensor devices.

In another embodiment of the disclosure, there is provided a method for monitoring structural health of a composite structure using molybdenum foil layers. The method comprises treating a surface of each of a plurality of molybdenum foil layers. The method further comprises interweaving the surface treated molybdenum foil layers with a plurality of composite material layers. The method further comprises bonding with an adhesive layer each of the surface treated molybdenum foil layers to adjacent composite material layers to form a molybdenum composite hybrid laminate having improved yield strength. The method further comprises coupling one or more electrical sensor devices to the one or more laminates. The method further comprises driving electrical current through the molybdenum foil layers with the one or more electrical sensor devices. The method further comprises monitoring any change in flow of the electrical current through the molybdenum foil layers with the one or more electrical sensor devices. The method further comprises obtaining structural health data of the composite structure via one or more signals from the one or more electrical sensor devices.

In another embodiment there is provided a method of fabricating an electrical bus into an aircraft structure using molybdenum foil layers. The method comprises treating a surface of each of a plurality of molybdenum foil layers. The method further comprises interweaving the surface treated molybdenum foil layers with a plurality of composite material layers, the molybdenum foil layers acting as an electrical bus. The method further comprises bonding with an adhesive layer each of the surface treated molybdenum foil layers to adjacent composite material layers to form a molybdenum composite hybrid laminate having improved yield strength. The method further comprises fabricating the electrical bus of the molybdenum composite hybrid laminate into an aircraft structure.

In another embodiment there is provided a method of fabricating into an aircraft structure an aircraft composite keel beam for dispersing electrical current from a lightning strike, the method using molybdenum foil layers. The method comprises treating a surface of each of a plurality of molybdenum foil layers. The method further comprises interweaving the surface treated molybdenum foil layers with a plurality of composite material layers, the molybdenum foil layers being an aircraft composite keel beam and current return path dispersing electrical current from a lightning strike to an aircraft structure. The method further comprises bonding with an adhesive layer each of the surface treated molybdenum foil layers to adjacent composite material layers to form a molybdenum composite hybrid laminate having improved yield strength. The method further comprises using the molybdenum composite hybrid laminate in the aircraft structure to disperse electrical current from the lightning strike to the aircraft structure.

In another embodiment there is provided a method of improving lightning attenuation of a composite structure using molybdenum foil layers. The method comprises treating a surface of each of a plurality of molybdenum foil layers. The method further comprises interweaving the surface treated molybdenum foil layers with a plurality of composite material layers, the molybdenum foil layers being electrical energy dissipation paths improving lightning attenuation of a composite structure. The method further comprises bonding with an adhesive layer each of the surface treated molybdenum foil layers to adjacent composite material layers to form a molybdenum composite hybrid laminate having improved yield strength. The method further comprises using the molybdenum composite hybrid laminate in the composite structure to improve lightning attenuation of the composite structure.

In another embodiment there is provided a method of improving thermal impingement resistance of a composite structure using molybdenum foil layers. The method comprises treating a surface of each of a plurality of molybdenum foil layers. The method further comprises interweaving the surface treated molybdenum foil layers with a plurality of composite material layers, the molybdenum foil layers being thermal penetration barriers and thermal energy dissipation paths improving thermal impingement resistance of a composite structure. The method further comprises bonding with an adhesive layer each of the surface treated molybdenum foil layers to adjacent composite material layers to form a molybdenum composite hybrid laminate having improved yield strength. The method further comprises using the molybdenum composite hybrid laminate in the composite structure to improve thermal impingement resistance of the composite structure.

In another embodiment there is provided a method of improving a cure cycle of a composite structure using molybdenum foil layers. The method comprises treating a surface of each of a plurality of molybdenum foil layers. The method further comprises interweaving the surface treated molybdenum foil layers with a plurality of composite material layers, the molybdenum foil layers being thermal and temperature controllers improving a cure cycle of a composite structure. The method further comprises bonding with an adhesive layer each of the surface treated molybdenum foil layers to adjacent composite material layers to form a molybdenum composite hybrid laminate having improved yield strength. The method further comprises using the molybdenum composite hybrid laminate in the composite structure to improve the cure cycle of the composite structure.

In another embodiment there is provided a method of improving impact durability of a composite structure using molybdenum foil layers. The method comprises treating a surface of each of a plurality of molybdenum foil layers. The method further comprises interweaving the surface treated molybdenum foil layers with a plurality of composite material layers, the molybdenum foil layers being load dissipation paths improving impact durability of a composite structure. The method further comprises bonding with an adhesive layer each of the surface treated molybdenum foil layers to adjacent composite material layers to form a molybdenum composite hybrid laminate having improved yield strength. The method further comprises using the molybdenum composite hybrid laminate in the composite structure to improve impact durability of the composite structure.

In another embodiment there is provided a method of steering load around non-load bearing areas in a composite structure using molybdenum foil layers. The method comprises treating a surface of each of a plurality of molybdenum foil layers. The method further comprises interweaving the surface treated molybdenum foil layers with a plurality of composite material layers, the molybdenum foil layers being load steering paths steering load around non-load bearing areas in a composite structure. The method further comprises bonding with an adhesive layer each of the surface treated molybdenum foil layers to adjacent composite material layers to form a molybdenum composite hybrid laminate having improved yield strength. The method further comprises using the molybdenum composite hybrid laminate in the composite structure to steer load around the non-load bearing areas in the composite structure.

In another embodiment there is provided a method of reinforcing and drawing load away from a repair area in a composite structure using molybdenum foil layers. The method comprises treating a surface of each of a plurality of molybdenum foil layers. The method further comprises interweaving the surface treated molybdenum foil layers with a plurality of composite material layers, the molybdenum foil layers being reinforcement elements and load drawing paths reinforcing and drawing load away from a repair area in a composite structure. The method further comprises bonding with an adhesive layer each of the surface treated molybdenum foil layers to adjacent composite material layers to form a molybdenum composite hybrid laminate having improved yield strength. The method further comprises using the molybdenum composite hybrid laminate in the composite structure to reinforce and draw load away from the repair area in the composite structure.

In another embodiment there is provided a method of mitigating fiber distortion in a composite structure using molybdenum foil layers. The method comprises treating a surface of each of a plurality of molybdenum foil layers. The method further comprises interweaving the surface treated molybdenum foil layers with a plurality of composite material layers, the molybdenum foil layers being fiber stabilizers mitigating fiber distortion in a composite structure. The method further comprises bonding with an adhesive layer each of the surface treated molybdenum foil layers to adjacent composite material layers to form a molybdenum composite hybrid laminate having improved yield strength. The method further comprises using the molybdenum composite hybrid laminate in the composite structure to mitigate fiber distortion in the composite structure.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 9 is an illustration of a schematic diagram of another one of the embodiments of a molybdenum composite hybrid laminate of the disclosure where the molybdenum foil layers act as electrical energy dissipation paths for improved lightning attenuation;

FIG. 10 is an illustration of a schematic diagram of another one of the embodiments of a molybdenum composite hybrid laminate of the disclosure where the molybdenum foil layers act as thermal penetration barriers and thermal energy dissipation paths for improved thermal impingement resistance;

FIG. 11 is an illustration of a schematic diagram of another one of the embodiments of a molybdenum composite hybrid laminate of the disclosure where the molybdenum foil layers act as load dissipation paths for improved impact durability;

FIG. 12A is an illustration of a schematic diagram of another one of the embodiments of a molybdenum composite hybrid laminate of the disclosure where the molybdenum foil layers act as load steering paths for non-load bearing areas;

FIG. 12B is an illustration of a schematic diagram of a cross-section taken at lines 12B-12B of FIG. 12A;

FIG. 13 is an illustration of a schematic diagram of another one of the embodiments of a molybdenum composite hybrid laminate of the disclosure where the molybdenum foil layers act as thermal and temperature controllers for improving a cure cycle;

FIG. 14A is an illustration of a schematic diagram of another one of the embodiments of a molybdenum composite hybrid laminate of the disclosure where the molybdenum foil layers act as reinforcement elements and load drawing paths for a patch repair area;

FIG. 14B is an illustration of a schematic diagram of a cross-section taken at lines 14B-14B of FIG. 14A;

FIG. 14C is an illustration of a schematic diagram of another one of the embodiments of a molybdenum composite hybrid laminate of the disclosure where the molybdenum foil layers act as reinforcement elements and load drawing paths for a scarf repair area;

FIG. 14D is an illustration of a schematic diagram of a cross-section taken at lines 14D-14D of FIG. 14C;

FIG. 17 is an illustration of a schematic diagram of a composite structure having areas of fiber distortion;

FIG. 18 is an illustration of a schematic diagram of another one of the embodiments of a molybdenum composite hybrid laminate of the disclosure where the molybdenum foil layers act as fiber stabilizers; and, FIGS. 19-29 are flow diagrams illustrating exemplary embodiments of methods of the disclosure.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
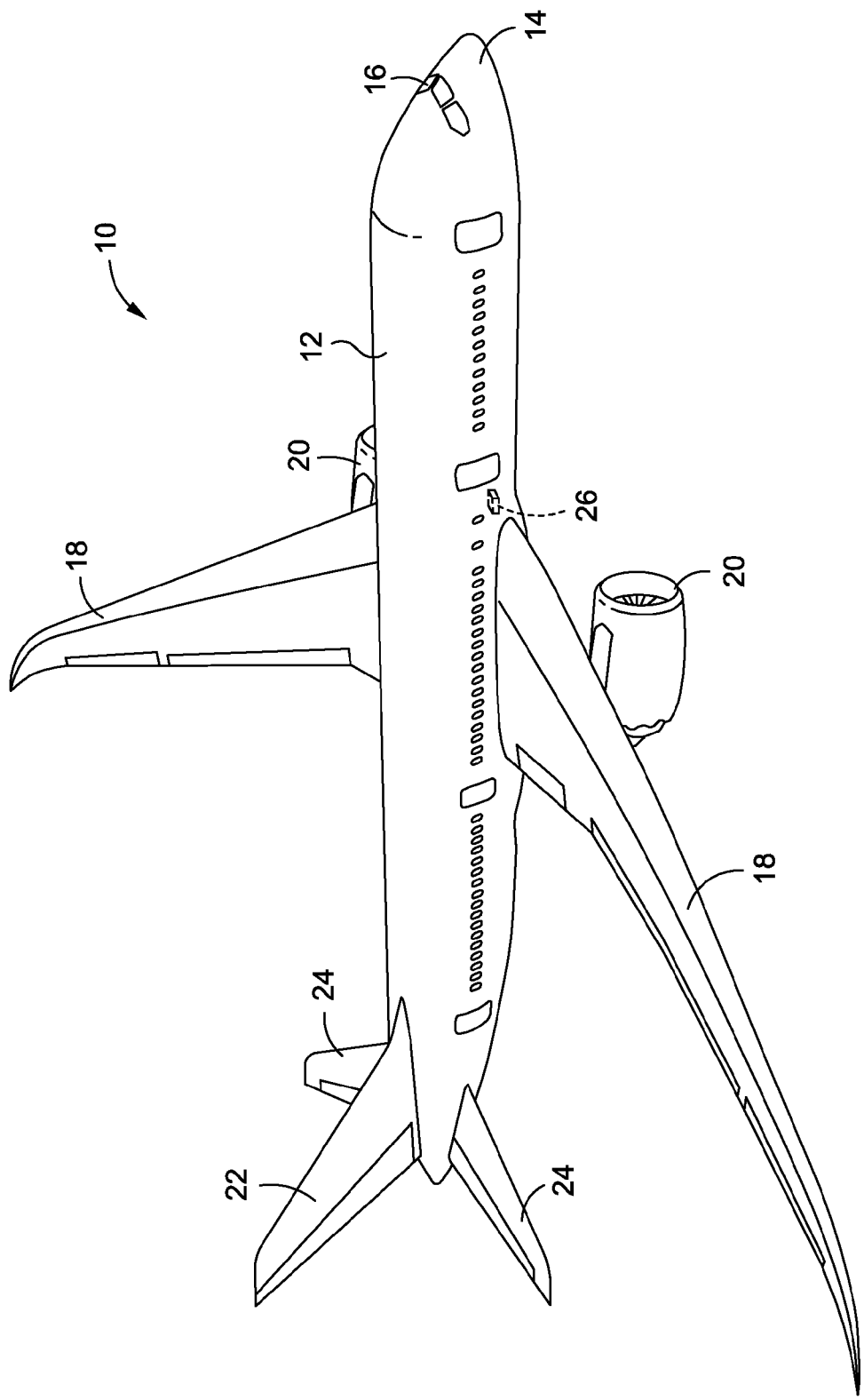
FIG. 1 is an illustration of a perspective view of an aircraft which may incorporate one or more advantageous embodiments of a molybdenum composite hybrid laminate of the disclosure.

Now referring to the Figures, FIG. 1 is an illustration of a perspective view of an exemplary aircraft structure 10 which may incorporate one or more advantageous embodiments of a molybdenum composite hybrid laminate 100 (see FIG. 4) of the disclosure. As shown in FIG. 1, the aircraft structure 10 comprises a fuselage 12, a nose 14, a cockpit 16, wings 18 operatively coupled to the fuselage 12, one or more propulsion units 20, a tail vertical stabilizer 22, one or more tail horizontal stabilizers 24, and one or more keel beams 26. The aircraft 10 structure may be made from composite and/or metallic materials that may be used on such portions of the aircraft structure 10, including but not limited to, the fuselage 12, the nose 14, the wings 18, the tail vertical stabilizer 22, the one or more tail horizontal stabilizers 24, and the one or more keel beams 26. Although the aircraft 10 shown in FIG. 1 is generally representative of a commercial passenger aircraft, the molybdenum composite hybrid laminate 100, as disclosed herein, may also be employed in other types of aircraft. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of methods, systems, and apparatuses in accordance with the disclosure may be utilized in other vehicles, such as boats and other watercraft, trains, automobiles, trucks, and buses.

Figure 2:
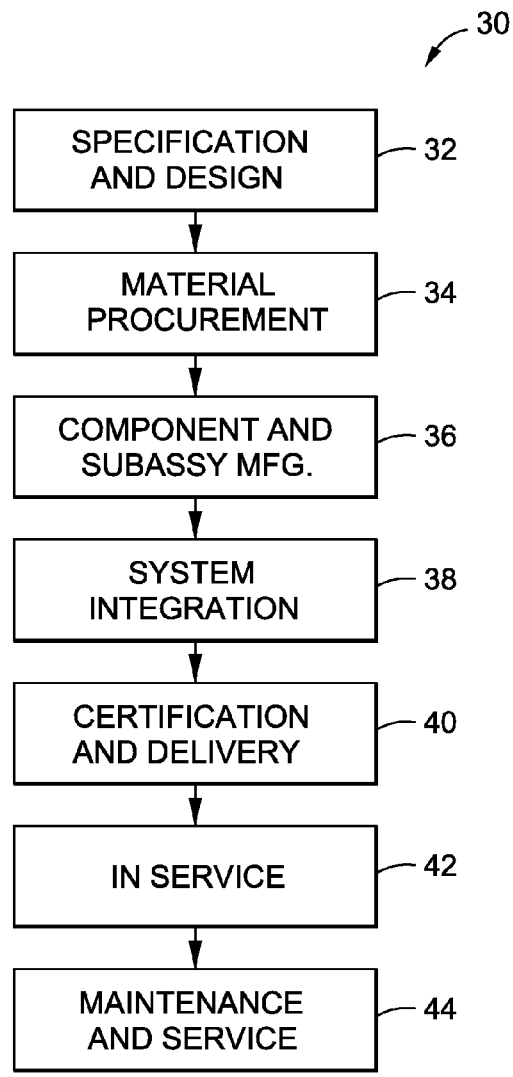
FIG. 2 is an illustration of a flow diagram of an aircraft production and service methodology.
Figure 3:
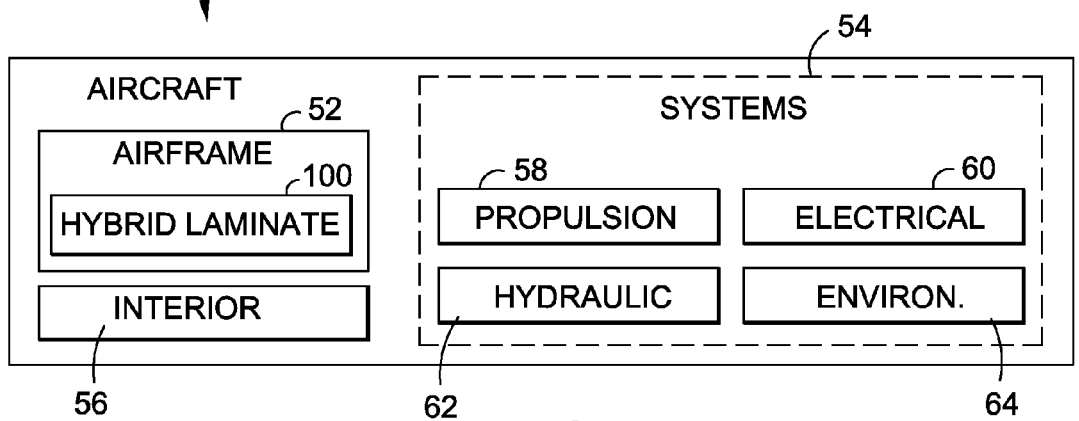
FIG. 3 is an illustration of a functional block diagram of an aircraft.

FIG. 2 is an illustration of a flow diagram of an aircraft production and service methodology 30. FIG. 3 is an illustration of a functional block diagram of an aircraft 50. Referring to FIGS. 2-3, embodiments of the disclosure may be described in the context of the aircraft manufacturing and service method 30 as shown in FIG. 2 and the aircraft 50 as shown in FIG. 3. During pre-production, exemplary method 30 may include specification and design 32 of the aircraft 50 and material procurement 34. During production, component and subassembly manufacturing 36 and system integration 38 of the aircraft 50 takes place. Thereafter, the aircraft 50 may go through certification and delivery 40 in order to be placed in service 42. While in service 42 by a customer, the aircraft 50 is scheduled for routine maintenance and service 44 (which may also include modification, reconfiguration, refurbishment, and so on).

Each of the processes of method 30 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 3, the aircraft 50 produced by exemplary method 30 may include an airframe 52 with a plurality of systems 54 and an interior 56. The airframe 52 may incorporate one or more advantageous embodiments of the molybdenum composite hybrid laminate 100 (see FIG. 4) of the disclosure. Examples of high-level systems 54 include one or more of a propulsion system 58, an electrical system 60, a hydraulic system 62, and an environmental system 64. Any number of other systems may be included. Although an aerospace example is shown, the principles of the invention may be applied to other industries, such as the automotive industry.

Apparatus and methods embodied herein may be employed during any one or more of the stages of the production and service method 30. For example, components or subassemblies corresponding to production process 36 may be fabricated or manufactured in a manner similar to components or subassemblies produced while the aircraft 50 is in service 42. Also, one or more apparatus embodiments, method embodiments, or a combination thereof may be utilized during the production stages 36 and 38, for example, by substantially expediting assembly of or reducing the cost of an aircraft 50. Similarly, one or more of apparatus embodiments, method embodiments, or a combination thereof may be utilized while the aircraft 50 is in service 42, for example and without limitation, to maintenance and service 44.

Figure 4:
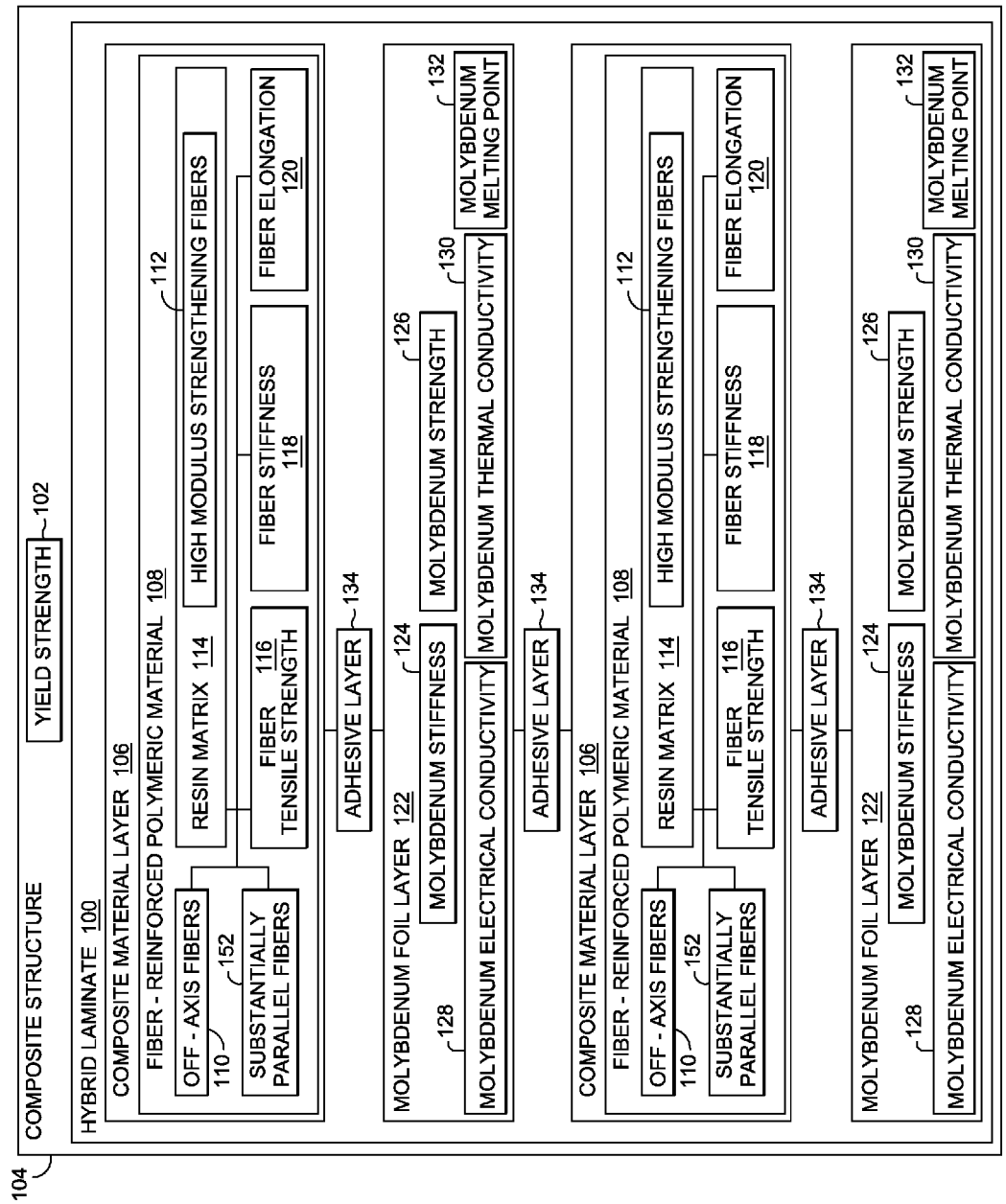
FIG. 4 is an illustration of a functional block diagram of one of the embodiments of a molybdenum composite hybrid laminate the disclosure.

FIG. 4 is an illustration of a functional block diagram of one of the embodiments of the molybdenum composite hybrid laminate 100 the disclosure. As shown in FIG. 4, there is provided the molybdenum composite hybrid laminate 100 to improve yield strength 102 of a composite structure 104. The molybdenum composite hybrid laminate 100 comprises a plurality of composite material layers 106. Each of the composite material layers 106 comprises a fiber-reinforced polymeric material 108. The fiber-reinforced polymeric material 108 preferably comprises off-axis fibers 110 (see FIG. 7) and substantially parallel fibers 152 (see FIG. 7) in a resin matrix 114 (see FIG. 7). The off-axis fibers 110 and substantially parallel fibers 152 preferably comprise high modulus strengthening fibers 112 disposed in the resin matrix 114. The high modulus strengthening fibers 112 may be made of a material comprising graphite, glass, carbon, boron, ceramics, aramids, polyolefins, polyethylenes, polymers, tungsten carbide, or other suitable materials. The resin matrix 114 may be made of resin material comprising thermosetting resins such as epoxies and polyesters, thermoplastic resins such as polyamides, polyolefins and fluoropolymers, hybrid polymer resins with properties of both thermosetting resins and thermoplastic resins, or other suitable resin materials. The off-axis fibers 110 and substantially parallel fibers 152 preferably have a fiber tensile strength 116 in a range of about 500 KSI (thousands of pounds per square inch) to about 1000 KSI. The off-axis fibers 110 and substantially parallel fibers 152 preferably have a fiber stiffness 118 in a range of about 32 MSI (millions of pounds per square inch) to about 100 MSI.

The off-axis fibers 110 and substantially parallel fibers 152 preferably have a fiber elongation 120 in a range of about 0.1% to about 0.5% or greater of the original fiber length. Each composite material layer 106 preferably has a thickness in a range of from about 1 mil to about 20 mils. More preferably, each composite material layer 106 has a thickness in a range of from about 4 mils to about 8 mils.

The molybdenum composite hybrid laminate 100 further comprises a plurality of surface treated molybdenum foil layers 122 interweaved between the composite material layers 106. Each of the surface treated molybdenum foil layers 122 has a sufficient molybdenum stiffness 124 to leverage the fiber tensile strength 116 and the fiber stiffness 118 of the off-axis fibers 110 in adjacent composite material layers 106 via Poisson's effects in the surface treated molybdenum foil layers 122. For purposes of this disclosure, "Poisson's effects" means the dual effect that a compression load has on an object, that is, the compression causes the object to become shorter in the direction of the compressive load and wider laterally. For each different type of material, there is a specific ratio of strain in the axial direction to strain in the transverse direction, and this is referred to as the "Poisson ratio". The molybdenum stiffness 124 comprises 47 MSI (millions of pounds per square inch). The high molybdenum stiffness 124 of the surface treated molybdenum foil layer 122 allows the surface treated molybdenum foil layer 122 to leverage the fiber tensile strength 116 and the fiber stiffness 118 of the off-axis fibers 110 in the fiber-reinforced polymeric material 108 through Poisson's effects in the surface treated molybdenum foil layer 122 and prevents the off-axis fibers 110 and substantially parallel fibers 152 in the fiber-reinforced polymeric material 108 from buckling in compression.

Figure 7:
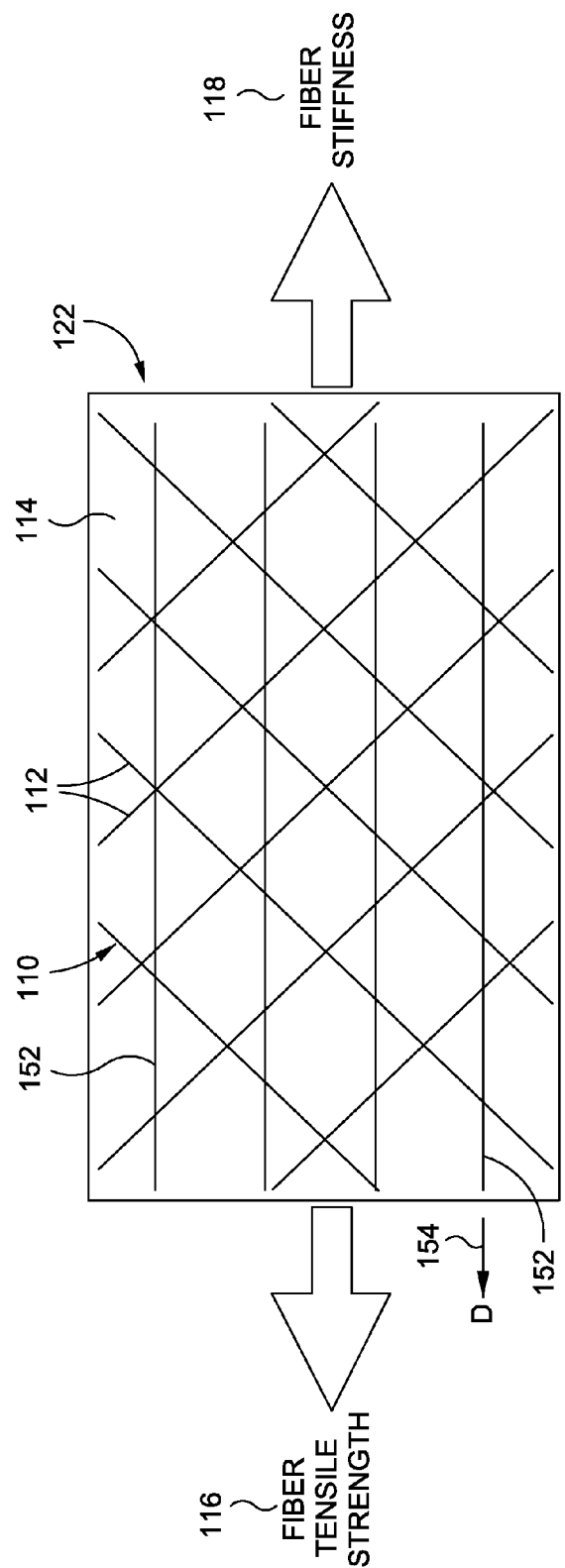
FIG. 7 is an illustration of a schematic diagram of off-axis fibers leveraged through Poisson's effects in the surface treated molybdenum foil layer.

FIG. 7 is an illustration of a schematic diagram of the off-axis fibers 110 leveraged through Poisson's effects in the surface treated molybdenum foil layer 122. FIG. 7 shows the off-axis fibers 110 comprising high modulus strengthening fibers 112 in the resin matrix 114 and shows substantially parallel fibers 152 in the resin matrix 114 and in a direction D of a load path 154. The design of the molybdenum composite hybrid laminate 100 enables leveraging of the strength of both the substantially parallel fibers 152 that run in a direction D of a load path 154, and the surface treated molybdenum foil layer 122 enables leveraging of the fiber tensile strength 116 and the fiber stiffness 118 of the off-axis fibers 110. In addition, the surface treated molybdenum foil layer 122 may be constrained and may not act in a standard Poisson's effect manner. Moreover, a tri-axial loading state, that is, a state where there is significant stress being applied in all three directions x, y, and z, exists in the surface treated molybdenum foil layer 122 to increase an actual yield point or yield strength of the surface treated molybdenum foil layer 122 depending on the bond strength of the surface treated molybdenum foil layer 122. Increasing the actual yield point or yield strength enables additional z bonding to be applied to the molybdenum foil by the bond.

As shown in FIG. 4, each of the surface treated molybdenum foil layers 122 further has a molybdenum strength 126. Preferably, the molybdenum strength 126 is in a range of about 125 KSI (thousands of pounds per square inch) to about 160 KSI. As shown in FIG. 4, each of the surface treated molybdenum foil layers 122 further has a molybdenum electrical conductivity 128. Preferably, the molybdenum electrical conductivity 128 is about $17.9 \times 10^6$ 1/Ohm-m (Ohm-meter). As shown in FIG. 4, each of the surface treated molybdenum foil layers 122 further has a molybdenum thermal conductivity 130. Preferably, the molybdenum thermal conductivity 130 is about 138 W $m^{-1}$ $K^{-1}$. (Watts per meter Kelvin). As shown in FIG. 4, each of the surface treated molybdenum foil layers 122 further has a molybdenum melting point 132. Each surface treated molybdenum foil layer 122 preferably has a thickness in a range of from about 1 mil to about 40 mil.

The surface treated molybdenum foil layers 122 are preferably surface treated to improve bonding between the surface treated molybdenum foil layer 122 interface with an adjacent composite material layer 106. The surface treated molybdenum foil layer 122 is preferably surface treated via one or more surface treatments comprising sol gel surface treatment, water based sol gel paint, grit blasting, sanding, sandblasting, solvent wiping, abrading, chemical cleaning, chemical etching, laser ablation, or another suitable surface treatment. Useful surface treatment processes are described, for example, in U.S. Pat. Nos. 3,959,091; 3,989,876; 4,473,446; and, 6,037,060, all of which are incorporated herein by reference.

The molybdenum composite hybrid laminate 100 further comprises a plurality of adhesive layers 134 disposed between and bonding adjacent layers of the composite material layers 106 and the surface treated molybdenum foil layers 122. The adhesive layer 134 preferably comprises an adhesive made of a material such as thermosetting epoxy resin adhesives, epoxy adhesives, thermoplastic adhesives, polyimide adhesives, bismaleimide adhesives, polyurethane adhesives, toughened acrylic adhesives, or another suitable adhesive. Each adhesive layer 134 preferably has a thickness in a range of from about 0.5 mil to about 2.0 mil. Preferably, the adhesive layer 134 provides minimal adhesive to wet a surface 125a or 125b (see FIG. 6) of the molybdenum foil layer 122 to facilitate bonding with the adjacent composite material layer 106.

The molybdenum composite hybrid laminate 100 is used in a composite structure 104 and improves yield strength 102 (see FIG. 4) in the composite structure 104. The composite structure 104 may comprise an aircraft structure 10 (see FIG. 1) or another suitable composite structure. The molybdenum composite hybrid laminate 100 is preferably designed for low temperature applications, such as a temperature of less than about 500 degrees Fahrenheit. Exemplary low temperature applications may include use of the molybdenum composite hybrid laminate 100 for subsonic aircraft skins and substructures located away from the one or more propulsion units 20 (see FIG. 1), such as the aircraft jet engines.

Figure 5:
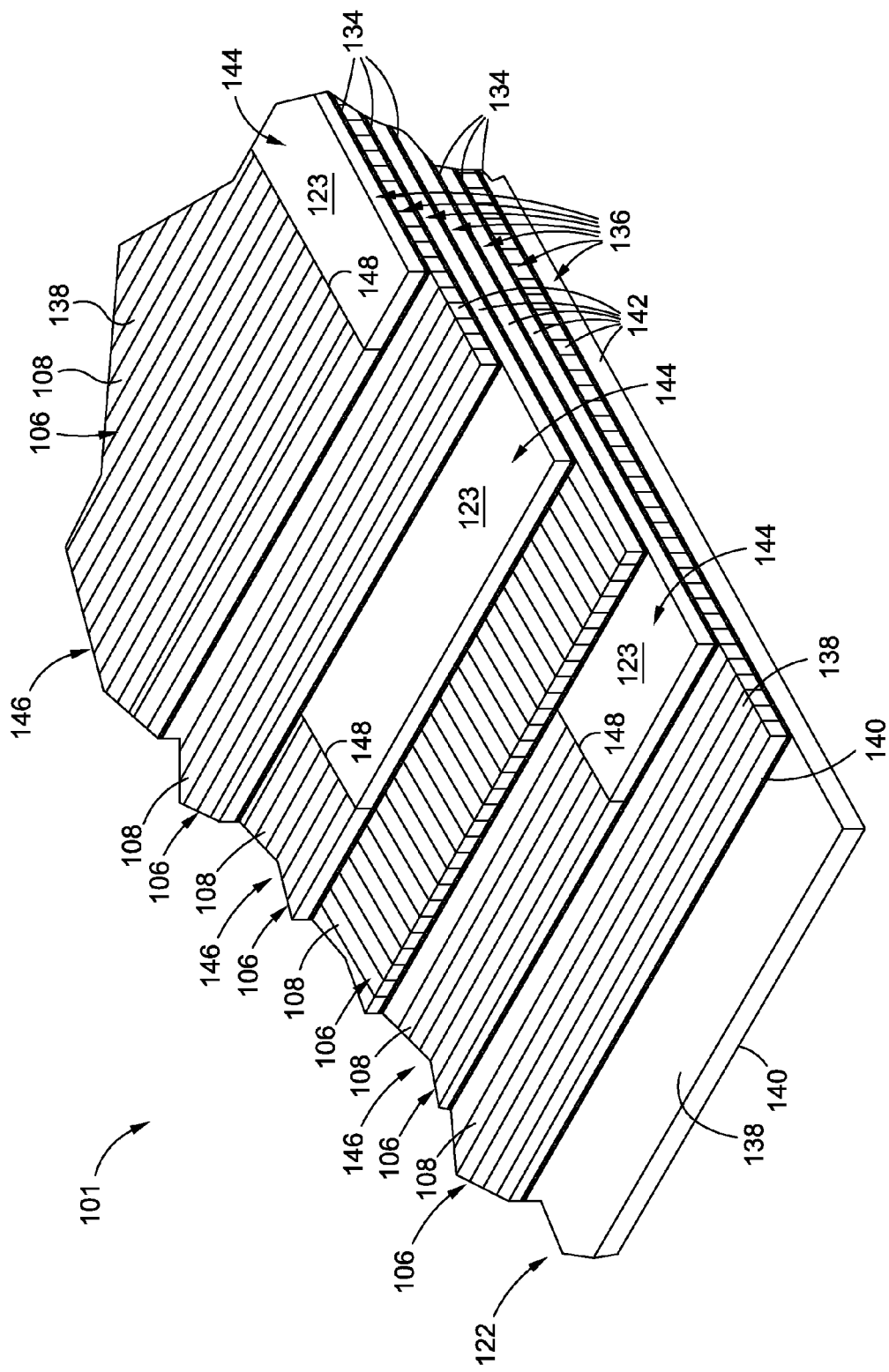
FIG. 5 is an illustration of an isometric partial sectional view of one of the embodiments of a molybdenum laminate lay up of the disclosure.

FIG. 5 is an illustration of an isometric partial sectional view of one of the embodiments of a molybdenum laminate lay up 101 of the disclosure. As shown in FIG. 5, the molybdenum laminate lay up 101 comprises a plurality of composite material layers 106 and a plurality of molybdenum foil containing layers 146 interweaved between the composite material layers 106. Each of the composite material layers 106, as discussed in detail above, preferably comprises a fiber-reinforced polymeric material 108. Each of the molybdenum foil containing layers 146 comprises a composite material layer 106, preferably comprising the fiber-reinforced polymeric material 108, where the composite material layer 106 may have a cutout portion 144 of molybdenum foil 123 that may be surface treated. As further shown in FIG. 5, the molybdenum laminate lay up 101 further comprises adhesive layers 134 disposed between and bonding adjacent layers of the composite material layers 106 and the interfacing molybdenum foil containing layers 146. The molybdenum laminate lay up 101 may further comprise one or more surface treated molybdenum foil layers 122 adjacent one or more composite material layers 106 and/or adjacent one or more molybdenum foil containing layers 146. As shown in FIG. 5, a surface treated molybdenum foil layer 122 is adjacent a composite material layer 106 and is bonded to the composite material layer 106 with an adhesive layer 134.

As shown in FIG. 5, each lamina or ply 136 of the molybdenum laminate lay up 101 has a first face 138 and a second face 140 spaced apart and extending to a terminal edge 142. As further shown in FIG. 5, in areas of the molybdenum laminate lay up 101 requiring specific reinforcement with the surface treated molybdenum foil 123, the cutout portion 144 may be formed in the molybdenum foil containing layer 146. The cut-out portion 144 may be formed, for example, by removing the composite material layer 106 up to an interior edge 148 (see FIG. 5), or by laying up the composite material layer 106 up to the interior edge 148, leaving the formed cutout portion 144. Suitable lay-up devices for forming the cutout portions 144 may comprise, for example, known contour tape laying machines (CTLM) (not shown), such as those manufactured by Cincinnati Machine, Inc. of Cincinnati, Ohio. The molybdenum foil containing layer 146 may then be completed with the surface treated molybdenum foil 123 to substantially fill each cutout portion 144. The molybdenum foil containing layer 146 comprises the composite material layer 106 that extends between the first face 138 and the second face 140 and has the interior edge 148 defining the cutout portion 144. The molybdenum foil containing layer 146 further comprises the surface treated molybdenum foil 123 that extends between the first face 138 and the second face 140 substantially from the interior edge 148 filling the cutout portion 144.

As further shown in FIG. 5, where multiple molybdenum foil containing layers 146 are to be interrupted, the interior edges 148 of the cutout portions 144 may be staggered in order to prevent the overlay of two or more interior edges 148 in order to provide improved load distribution by the surface treated molybdenum foil 123. The staggered interior edges 148 of the cutout portions 144 may also minimize or eliminate possible resin accumulation that may occur at the ends of the surface treated molybdenum foil 123. Interweaving surface treated molybdenum foil 123, as well as interrupting the composite material layer 106 in a single molybdenum foil containing layer 146 with the surface treated molybdenum foil 123 in accordance with the disclosure may yield distinct properties in the resulting molybdenum laminate lay up 101.

Figure 6:
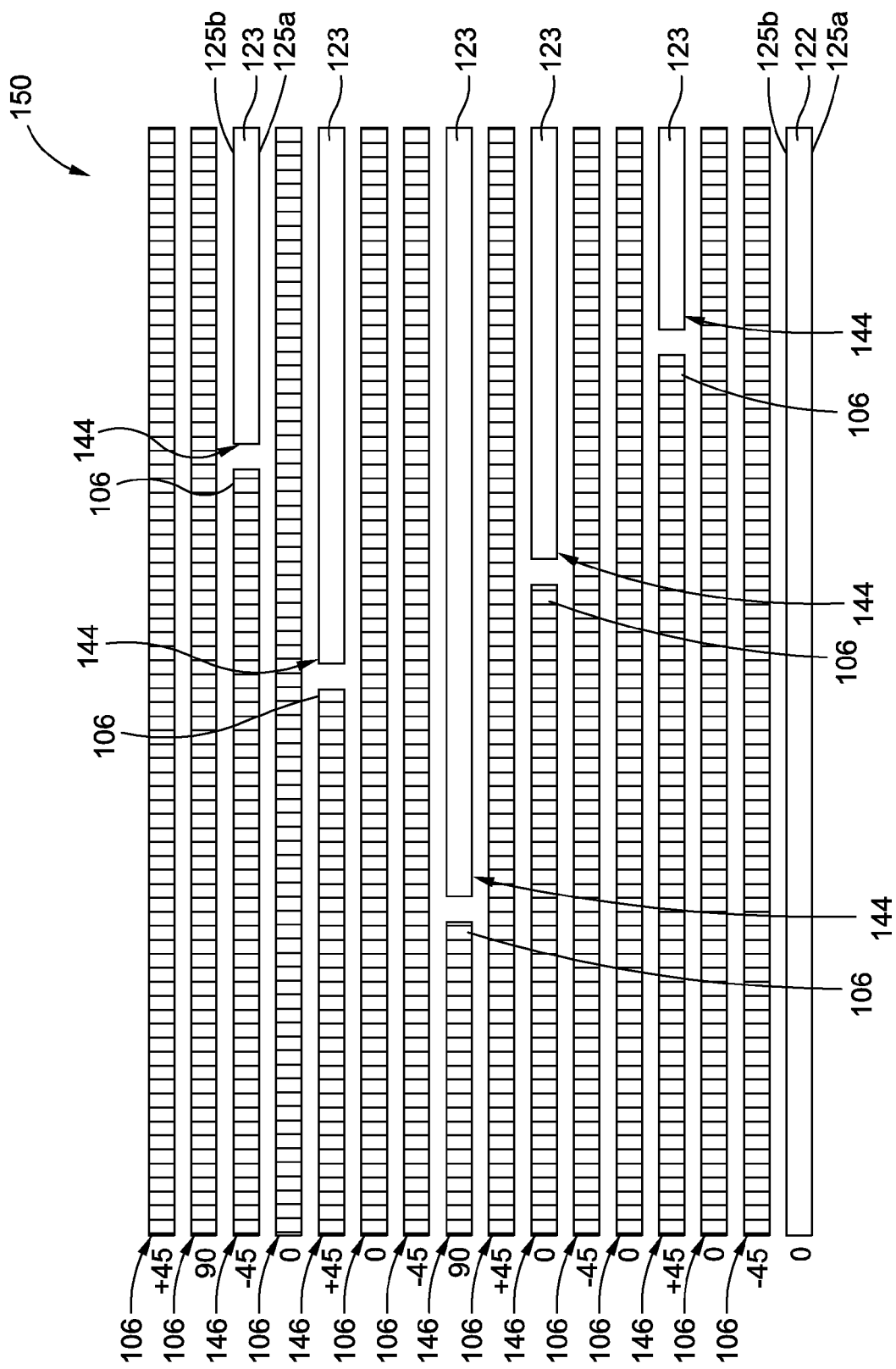
FIG. 6 is a side cross-sectional view of another one of the embodiments of a molybdenum laminate lay up of the disclosure.

FIG. 6 is a side cross-sectional view of another one of the embodiments of a molybdenum laminate lay up 150 of the disclosure. As shown in FIG. 6, the composite material layers 106 and the molybdenum foil containing layers 146 may be oriented at angles of approximately −45 (minus forty-five) degrees, approximately +45 (plus forty-five) degrees, approximately 0 (zero) degrees, or approximately 90 (ninety) degrees in one particular embodiment. Each molybdenum foil containing layer 146 comprises the composite material layer 106 having the cutout portion 144 of surface treated molybdenum foil 123. With the molybdenum laminate lay up 150, as well as the molybdenum laminate lay up 101 (see FIG. 5), preferably no two adjacent layers are oriented at the same angle, that is, an adjacent composite material layer 106 and a molybdenum foil containing layer 146 are not orientated at the same angle, an adjacent composite material layer 106 and a surface treated molybdenum foil layer 122 are not oriented at the same angle, and an adjacent molybdenum foil containing layer 146 and a surface treated molybdenum foil layer 122 are not oriented at the same angle.

Figure 8:
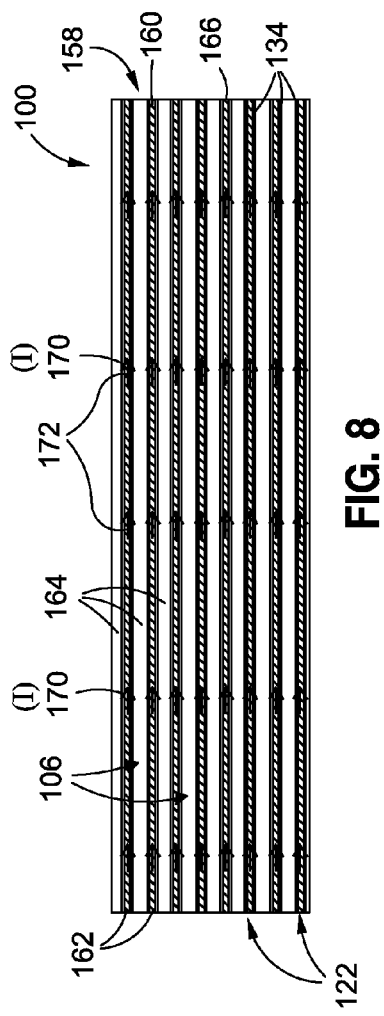
FIG. 8 is an illustration of a schematic diagram of one of the embodiments of a molybdenum composite hybrid laminate of the disclosure where the molybdenum foil layers act as an electrical bus.

In another embodiment of the disclosure, there is provided a molybdenum composite hybrid laminate 100 having molybdenum foil layers 122 that act as an electrical bus 160 (see FIG. 8) in a composite structure 104 (see FIG. 4), such as an aircraft structure 10 (see FIG. 1). FIG. 8 is an illustration of a schematic diagram of one of the embodiments of the molybdenum composite hybrid laminate 100 of the disclosure where the surface treated molybdenum foil layers 122 act as the electrical bus 160. For purposes of this application, an electrical bus means a distribution point in an aircraft electrical system from which electrical loads derive their power. The surface treated molybdenum foil layers 122 have a sufficient molybdenum electrical conductivity 128 (see FIG. 4) to enable the surface treated molybdenum foil layers 122 to act as the electrical bus 160 for integrating separate structural and electrical systems (not shown) into a single system 158 (see FIG. 8) for the composite structure 104 (see FIG. 4), such as the aircraft structure 10 (see FIG. 1), resulting in an overall reduced weight of the aircraft structure 10.

As discussed above, the molybdenum composite hybrid laminate 100 comprises a plurality of composite material layers 106 (see FIG. 8). Each composite material layer 106 comprises a fiber-reinforced polymeric material 108 (see FIG. 4). Preferably, the composite material layer 106 comprises a graphite/resin based material layer 164 (see FIG. 8). The molybdenum composite hybrid laminate 100 further comprises a plurality of surface treated molybdenum foil layers 122 (see FIG. 8) interweaved between the composite material layers 106 (see FIG. 8). The surface treated molybdenum foil layers 122 have a sufficient molybdenum stiffness 124 (see FIG. 4) to leverage the fiber tensile strength 116 (see FIG. 4) and the fiber stiffness 118 (see FIG. 4) of the off-axis fibers 110 (see FIG. 4) in adjacent composite material layers 106 via Poisson's effects in the surface treated molybdenum foil layers 122. The molybdenum composite hybrid laminate 100 laminate further comprises a plurality of adhesive layers 134 (see FIG. 8) disposed between and bonding adjacent layers of the composite material layers 106 and the surface treated molybdenum foil layers 122.

In this embodiment, preferably, the surface treated molybdenum foil layers 122 are separate from each other and have sufficient molybdenum electrical conductivity 128 (see FIG. 4) to enable the surface treated molybdenum foil layers 122 to perform as the electrical bus 160. Molybdenum is an excellent electrical conductor. It is this low electrical resistance characteristic that enables the surface treated molybdenum foil layers 122 to act as an excellent electrical bus for a wide range of electrical applications on the composite structure 104 (see FIG. 4), such as the aircraft structure 10 (see FIG. 1). Preferably, the molybdenum composite hybrid laminate 100 comprises multiple surface treated molybdenum foil layers 122 in the composite structure 104, and thus, a number of discrete conductors may be available. Each of the surface treated molybdenum foil layers 122 may comprise strips that are electrically separate from one another, and each of these layers or strips can act as individual circuit legs 162 (see FIG. 8) of a separate circuit. The adhesive layers 134 (see FIG. 8) may act as electrical insulation layers 166 (see FIG. 8) for the surface treated molybdenum foil layers 122 when separate circuits are desired. Electrical current (I) 170 (see FIG. 8) may be conducted by the individual layers of the surface treated molybdenum foil layers 122, as electrical current flow 172 (see FIG. 8) moves through the single system 158 (see FIG. 8). This embodiment may integrate the electrical requirements of the electrical system and the structural requirements of the structural system into the single system 158, resulting in significant weight savings.

In another embodiment there is provided a method 430 of fabricating an electrical bus 160 (see FIG. 8) into a composite structure 104 (see FIG. 4), such as an aircraft structure 10 (see FIG. 1), using molybdenum foil layers 122 (see FIG. 8). FIG.

21 is a flow diagram illustrating one of the exemplary embodiments of the method 430 of fabricating the electrical bus 160. The method 430 comprises step 432 of treating a surface 125a or 125b (see FIG. 6) of each of a plurality of molybdenum foil layers 122. Treating the surface 125a or 125b of the molybdenum foil layers 122 may comprise one or more surface treatments comprising sol gel surface treatment, water based sol gel paint, grit blasting, sanding, sandblasting, solvent wiping, abrading, laser ablation, chemical cleaning, chemical etching, or another suitable surface treatment.

The method 430 further comprises step 434 of interweaving the surface treated molybdenum foil layers 122 with a plurality of composite material layers 106 (see FIG. 8). The molybdenum foil layers 122 act as an electrical bus 160 (see FIG. 8). The molybdenum foil layers 122 have a sufficient molybdenum stiffness 124 (see FIG. 4) to leverage a fiber tensile strength 116 (see FIG. 4) and a fiber stiffness 118 (see FIG. 4) of off-axis fibers 110 (see FIG. 4) in adjacent composite material layers 106 via Poisson's effects in the molybdenum foil layers 122. The molybdenum foil layers 122 are preferably separate from each other and further have a sufficient molybdenum electrical conductivity 128 (see FIG. 4) to enable the molybdenum foil layers 122 to act as the electrical bus 160 in the aircraft structure 10. The electrical bus 160 may integrate separate structural and electrical systems into a single system 158 (see FIG. 8) in the aircraft structure 10, thus resulting in an overall reduced weight of the aircraft structure 10.

The method 430 further comprises step 436 of bonding with an adhesive layer 134 (see FIG. 8) each of the surface treated molybdenum foil layers 122 to adjacent composite material layers 106 to form a molybdenum composite hybrid laminate 100 (see FIG. 8) having improved yield strength 102 (see FIG. 4). The interweaving step 434 and bonding step 436 may further comprise one or more of compacting, consolidating, and curing the interweaved surface treated molybdenum foil layers 122 and the composite material layers 106. The method 430 further comprises step 438 of fabricating the electrical bus 160 of the molybdenum composite hybrid laminate 100 into an aircraft structure 10.

Figure 16:
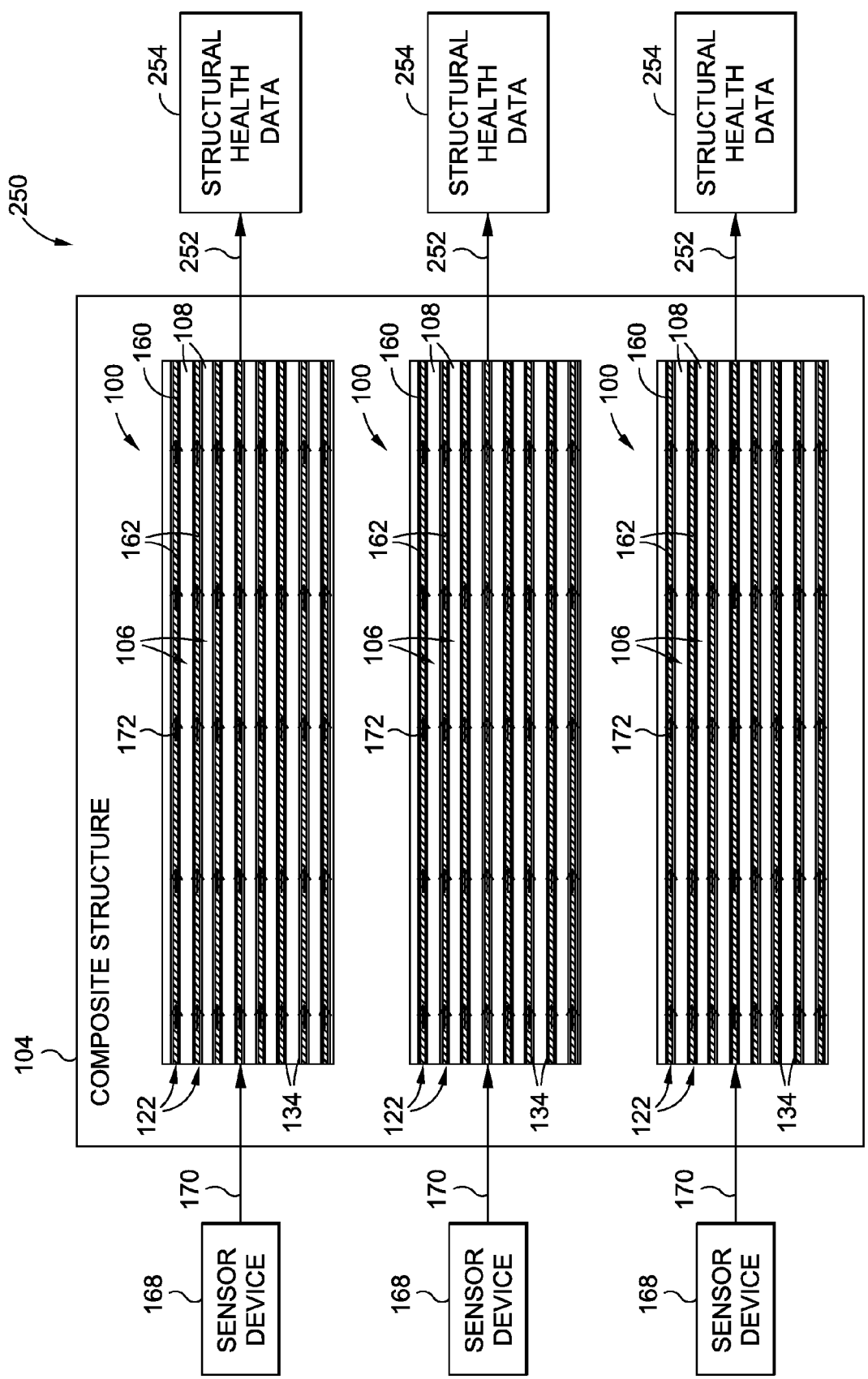
FIG. 16 is an illustration of a functional block diagram of one of the exemplary embodiments of a system for monitoring structural health of a composite structure of the disclosure.

In another embodiment of the disclosure, there is provided a system 250 (see FIG. 16) for monitoring structural health of a composite structure 104 (see FIG. 16). FIG. 16 is an illustration of a functional block diagram of one of the exemplary embodiments of the system 250 for monitoring structural health of the composite structure 104. As shown in FIG. 16, the system 250 comprises a composite structure 104, preferably an aircraft 10 (see FIG. 1), comprising one or more molybdenum composite hybrid laminates 100. As shown in FIG. 16, each molybdenum composite hybrid laminate 100 comprises a plurality of composite material layers 106, each composite material layer 106 comprising a fiber-reinforced polymeric material 108. As shown in FIG. 16, the molybdenum composite hybrid laminate 100 further comprises a plurality of surface treated molybdenum foil layers 122 interweaved between the composite material layers 106. The surface treated molybdenum foil layers 122 have a sufficient molybdenum stiffness 124 (see FIG. 4) to leverage the fiber tensile strength 116 (see FIG. 4) and the fiber stiffness (see FIG. 4) of the off-axis fibers 110 (see FIG. 4) in adjacent composite material layers 106 via Poisson's effects in the surface treated molybdenum foil layers 122. The surface treated molybdenum foil layers 122 are separate from each other and have a sufficient molybdenum electrical conductivity 128 (see FIG. 4) to enable the surface treated molybdenum foil layers 122 to perform as an electrical bus 160 (see FIG. 16). As shown in FIG. 16, the molybdenum composite hybrid laminate 100 further comprises a plurality of adhesive layers 134 disposed between and bonding adjacent layers of the composite material layers 106 and the surface treated molybdenum foil layers 122.

In this embodiment, as shown in FIG. 16, the system 250 further comprises one or more electrical sensor devices 168 coupled to one or more of the molybdenum composite hybrid laminates 100. The electrical sensor devices 168 drive electrical current 170 (see FIG. 16) through the surface treated molybdenum foil layers 122 and monitor any changes in electrical current flow 172 (see FIG. 16) through the surface treated molybdenum foil layers 122 in order to obtain structural health data 254 (see FIG. 16) of the composite structure 104 via one or more signals 252 (see FIG. 16) from the one or more electrical sensor devices 168. Such structural health data 254 may comprise lightning strike detection, inception of structural flaws, propagation of structural flaws, potential deterioration, and actual deterioration, or other suitable structural health data that may be detected via full or partial electrical current interruption.

The molybdenum foil provides enhanced mechanical properties to the composite lay-ups. In addition, the high molybdenum electrical conductivity 128 enables the molybdenum to perform well as an electrical bus 160 (see FIG. 16). Each of the surface treated molybdenum foil layers 122 may comprise strips that are electrically separate from one another. Each of these layers or strips can act as individual circuit legs 162 (see FIG. 16) of a separate circuit. In addition, the electrical current 170 that flows in these circuits of surface treated molybdenum foil 122 may be monitored for evidence of any potential deterioration.

The resistance of each circuit of surface treated molybdenum foil 122 may be monitored to provide evidence of sound structure. If the resistance or signal 252 changes, this may provide data about the soundness of the composite structure 104. This information may potentially allow greater useful life of the composite structure 104, such as an aircraft structure 10 (see FIG. 1), and greater in-service time for the aircraft structure 10 due to actual access to structural health data 254 or information about the soundness of the composite structure 104 instead of relying only on scheduled maintenance. The system 250 enables less out-of-service time for the aircraft structure 10 and enables refurbishment or repair of composite structures 104 when needed.

In another embodiment of the disclosure, there is provided a molybdenum composite hybrid laminate 100 (see FIG. 9) to improve lightning strike 180 (see FIG. 9) attenuation or dissipation of a composite structure 104 (see FIG. 4). FIG. 9 is an illustration of a schematic diagram of another one of the embodiments of the molybdenum composite hybrid laminate 100 of the disclosure where the surface treated molybdenum foil layers 122 act as electrical energy dissipation paths 186 improving high electrical energy impingement resistance to high electrical energy input 182 from a high electrical energy impingement source, such as a lightning strike 180. As shown in FIG. 9, when the high electrical energy impingement source, such as the lightning strike 180, hits the molybdenum composite hybrid laminate 100 of a composite structure 104 (see FIG. 4), high electrical energy input 182 occurs. The surface treated molybdenum foil layers 122 act as electrical energy dissipation paths 186 to rapidly conduct away electrical current 184, resulting in improved lightning strike 180 attenuation or dissipation by the molybdenum composite hybrid laminate 100. The surface treated molybdenum foil layers 122 have a sufficient molybdenum electrical conductivity 128 (see FIG. 4) which is high and a sufficient molybdenum thermal conductivity 130 (see FIG. 4) which is high to enable the surface treated molybdenum foil layers 122 to act as the electrical energy dissipation paths 186 thereby improving lightning strike 180 attenuation or dissipation of the composite structure 104 (see FIG. 4). The high molybdenum melting point 132 (see FIG. 4), the high molybdenum thermal conductivity 130 (see FIG. 4), and the high molybdenum electrical conductivity 128 (see FIG. 4) of the surface treated molybdenum foil layers 122 in the molybdenum composite hybrid laminate 100 enable the molybdenum composite hybrid laminate 100 to perform well while being subjected to extremely high electrical energy input 182 (see FIG. 9). The high molybdenum stiffness 124 (see FIG. 4) and the high molybdenum strength 126 (see FIG. 4), along with a low coefficient of thermal expansion (CTE) of the surface treated molybdenum foil layers 122, further provide improved mechanical properties. Typical CTE values of molybdenum are favorably compatible with typical CTE values of composite materials used in composite lay ups. For example, molybdenum may have a typical CTE value of between about $2.5 \times 10^{-6}$ to about $3.5 \times 10^{-6}$ inches/inch/° F. (degrees Fahrenheit), and composite materials used in composite lay ups may have typical CTE values of between about $0.5 \times 10^{-6}$ to about $6.0 \times 10^{-6}$ inches/inch/° F. The surface treated molybdenum foil layers 122 applied to the composite material layers 106, such as, for example, graphite/resin based material layers 164 (see FIG. 9) provide structural advantages along with improved lightning strike 180 attenuation or dissipation.

Each molybdenum composite hybrid laminate 100 for improving lightning strike 180 attenuation of a composite structure 104 comprises a plurality of composite material layers 106 (see FIG. 9), and each composite material layer 106 comprises a fiber-reinforced polymeric material 108 (see FIG. 4). Preferably, the composite material layer 106 comprises a graphite/resin based material layer 164. The molybdenum composite hybrid laminate 100 further comprises a plurality of surface treated molybdenum foil layers 122 (see FIG. 9) interweaved between the composite material layers 106. As discussed above, the surface treated molybdenum foil layers 122 have a sufficient molybdenum stiffness 124 (see FIG. 4) to leverage the fiber tensile strength 116 (see FIG. 4) and the fiber stiffness 118 (see FIG. 4) of the off-axis fibers 110 (see FIG. 4) in adjacent composite material layers 106 via Poisson's effects in the surface treated molybdenum foil layers 122. The surface treated molybdenum foil layers 122 are separate from each other and have a sufficient molybdenum electrical conductivity 128 (see FIG. 4) to enable the surface treated molybdenum foil layers 122 to perform as an electrical bus 160 (see FIG. 15). The molybdenum composite hybrid laminate 100 further comprises a plurality of adhesive layers 134 (see FIG. 9) disposed between and bonding adjacent layers of the composite material layers 106 and the surface treated molybdenum foil layers 122. The adhesive layers 134 (see FIG. 9) may act as electrical insulation layers 166 (see FIG. 9) for the surface treated molybdenum foil layers 122. The molybdenum composite hybrid laminate 100 is preferably used in a composite structure 104 (see FIG. 4), such as an aircraft structure 10 (see FIG. 1), and improves lightning strike 180 attenuation or dissipation of the composite structure 104.

Figure 23:
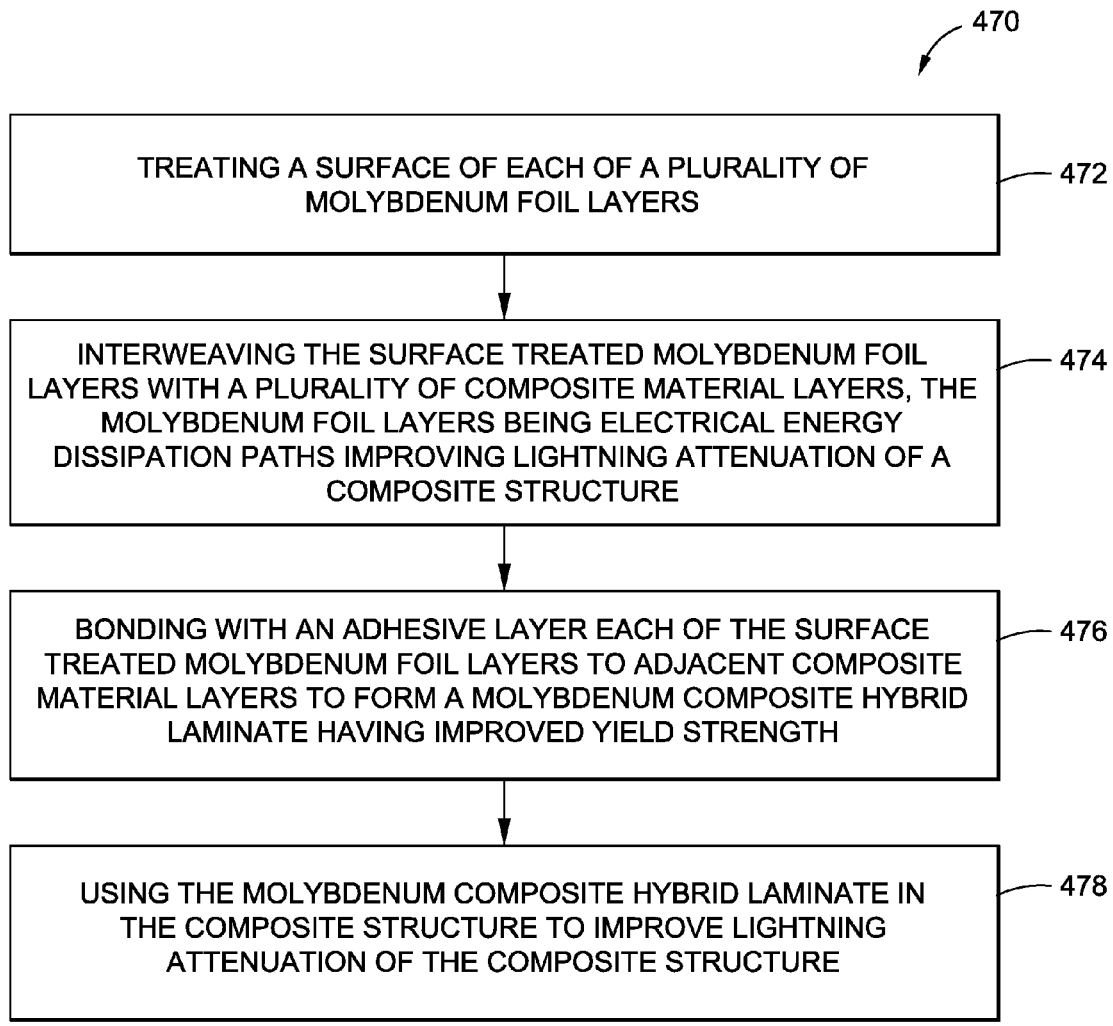

In another embodiment of the disclosure, there is provided a method 470 of improving lightning strike 180 (see FIG. 9) attenuation of a composite structure 104 (see FIG. 4) using molybdenum foil layers 122. FIG. 23 is a flow diagram illustrating one of the exemplary embodiments of the method 470 of improving lightning strike 180 attenuation of the composite structure 104 (see FIG. 4), such as aircraft structure 10 (see FIG. 1). The method 470 comprises step 472 of treating a surface 125a or 125b (see FIG. 6) of each of a plurality of molybdenum foil layers 122 (see FIG. 9). Treating the surface 125a or 125b of the molybdenum foil layers 122 may comprise one or more surface treatments comprising sol gel surface treatment, water based sol gel paint, grit blasting, sanding, sandblasting, solvent wiping, abrading, laser ablation, chemical cleaning, chemical etching, or another suitable surface treatment.

The method 470 further comprises step 474 of interweaving the surface treated molybdenum foil layers 122 with a plurality of composite material layers 106 (see FIG. 9). The molybdenum foil layers 122 act as electrical energy dissipation paths 186 (see FIG. 9) improving lightning strike 180 attenuation of a composite structure 104. The molybdenum foil layers 122 have a sufficient molybdenum stiffness 124 (see FIG. 4) to leverage a fiber tensile strength 116 (see FIG. 4) and a fiber stiffness 118 (see FIG. 4) of off-axis fibers 110 (see FIG. 4) in adjacent composite material layers 106 via Poisson's effects in the molybdenum foil layers 122. The molybdenum foil layers 122 further have a sufficient molybdenum electrical conductivity 128 (see FIG. 4) and a sufficient molybdenum thermal conductivity 130 (see FIG. 4) to enable the molybdenum foil layers 122 to act as electrical energy dissipation paths 186 (see FIG. 9) improving lightning strike 180 (see FIG. 9) attenuation of the composite structure 104 (see FIG. 4).

The method 470 further comprises step 476 of bonding with an adhesive layer 134 (see FIG. 9) each of the surface treated molybdenum foil layers 122 to adjacent composite material layers 106 (see FIG. 9) to form a molybdenum composite hybrid laminate 100 (see FIG. 9) having improved yield strength 102 (see FIG. 4). The interweaving step 474 and bonding step 476 may further comprise one or more of compacting, consolidating, and curing the interweaved surface treated molybdenum foil layers 122 and the composite material layers 106. The method 470 further comprises step 478 of using the molybdenum composite hybrid laminate 100 in the composite structure 104 to improve lightning strike 180 attenuation of the composite structure 104.

Figure 15:
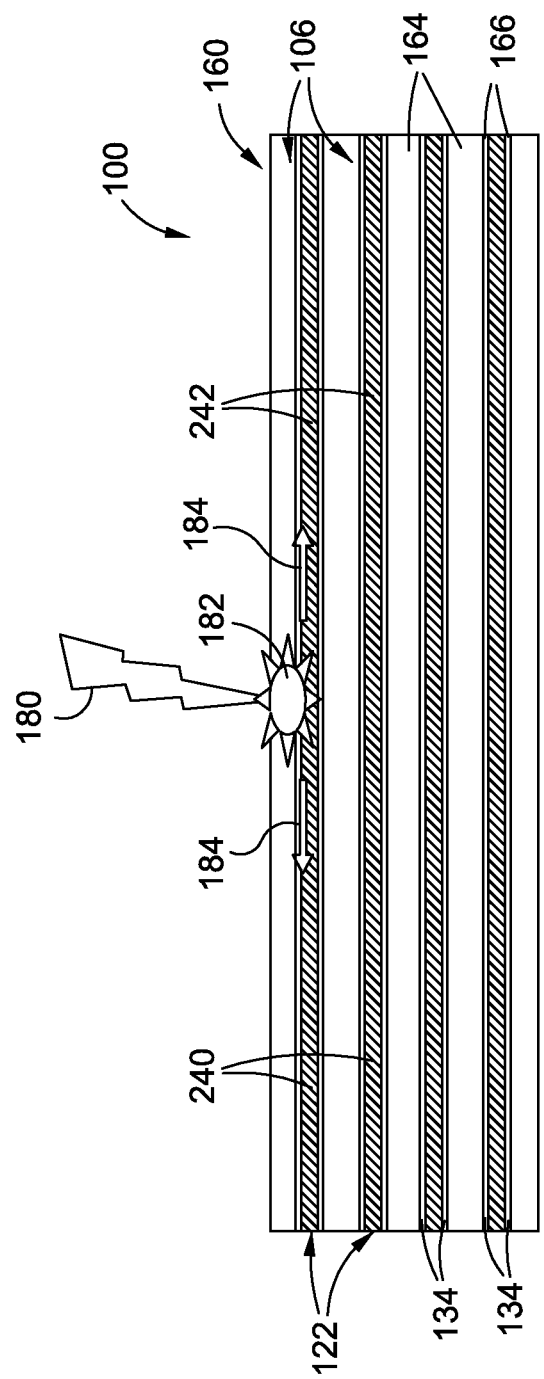
FIG. 15 is an illustration of a schematic diagram of another one of the embodiments of a molybdenum composite hybrid laminate of the disclosure where the molybdenum foil layers act as an aircraft composite keel beam and current return paths for dispersing electrical current from lightning strikes.

In another embodiment of the disclosure, there is provided a molybdenum composite hybrid laminate 100 to conduct current and act as an aircraft composite keel beam 240 (see FIG. 15) in a composite structure 104 (see FIG. 4), such as in an aircraft 10 (see FIG. 1). An aircraft keel beam 26, as shown in FIG. 1, is typically at the lower portion of the fuselage 12 (see FIG. 1) and essentially ties the fuselage 12 together. Lightweight aircraft composite structures, such as keel beams, require additional structurally parasitic conductors to effectively disperse current from a lightning strike 180 (see FIG. 15). FIG. 15 is an illustration of a schematic diagram of another one of the embodiments of a molybdenum composite hybrid laminate 100 of the disclosure where the surface treated molybdenum foil layers 122 act as both an aircraft composite keel beam 240 and current return paths 242 for lightning strikes 180. As shown in FIG. 15, when the high electrical energy impingement source, such as a lightning strike 180, hits the molybdenum composite hybrid laminate 100 of a composite structure 104 (see FIG. 4), high electrical energy input 182 occurs. The electrical current 184 (see FIG. 15) may be conducted by the surface treated molybdenum foil layers 122 in the molybdenum composite hybrid laminate 100. The surface treated molybdenum foil layers 122 enable higher molybdenum strength 126 (see FIG. 4) and higher molybdenum stiffness 124 (see FIG. 4) of the composite structure 104. Also, the high molybdenum electrical conductivity 128 (see FIG. 4) of the surface treated molybdenum foil layers 122 enables the surface treated molybdenum foil layers 122 to perform well as an electrical bus 160 (see FIG. 15). In addition, the surface treated molybdenum foil layers 122 may act as current return paths 242 to rapidly conduct away electrical current 184, resulting in improved lightning strike 180 protection by the molybdenum composite hybrid laminate 100. The surface treated molybdenum foil layers 122 have a sufficient molybdenum strength 126 (see FIG. 4), a sufficient molybdenum stiffness 124 (see FIG. 4), and a sufficient molybdenum electrical conductivity 128 (see FIG. 4) to enable the surface molybdenum foil layers 122 to act as an aircraft composite keel beam 240 (see FIG. 15) conducting electrical current 184 and providing a current return path 242 (see FIG. 15) for lightning strikes 180 (see FIG. 15) in the composite structure 104 (see FIG. 4). Due to enhanced mechanical properties and the ability to carry electrical current 184, the surface treated molybdenum foil layers 122 provide a uniquely advantageous molybdenum composite hybrid laminate 100 that may act effectively both as an aircraft composite keel beam 240 in aircraft design and as a current return path 242 for lightning strikes 180, which may result in overall reduced weight and cost. The surface treated molybdenum foil layers 122 provide a lightweight, high performing aircraft composite keel beam 240 that is effective in conducting electrical current 184 and acting as a lightning strike 180 current return path 242.

As shown in FIG. 15, each molybdenum composite hybrid laminate 100 comprises a plurality of composite material layers 106, and each composite material layer 106 comprises a fiber-reinforced polymeric material 108 (see FIG. 4). Preferably, the composite material layer 106 comprises a graphite/resin based material layer 164 (see FIG. 10). The molybdenum composite hybrid laminate 100 further comprises a plurality of surface treated molybdenum foil layers 122 interweaved between the composite material layers 106. As discussed above, the surface treated molybdenum foil layers 122 have a sufficient molybdenum stiffness 124 (see FIG. 4) to leverage the fiber tensile strength 116 (see FIG. 4) and the fiber stiffness 118 (see FIG. 4) of the off-axis fibers 110 (see FIG. 4) in adjacent composite material layers 106 via Poisson's effects in the surface treated molybdenum foil layers 122. The molybdenum foil layers 122 further have a sufficient molybdenum strength 126 (see FIG. 4), a sufficient molybdenum stiffness 124 (see FIG. 4), and the sufficient molybdenum electrical conductivity 128 (see FIG. 4) to enable the molybdenum foil layers 122 to act as an aircraft composite keel beam 240 (see FIG. 15) conducting electrical current 184 (see FIG. 15)) and providing a current return path 242 (see FIG. 15) for lightning strikes 180 (see FIG. 15). The molybdenum composite hybrid laminate 100 further comprises a plurality of adhesive layers 134 (see FIG. 15) disposed between and bonding adjacent layers of the composite material layers 106 and the surface treated molybdenum foil layers 122. The adhesive layers 134 (see FIG. 15) may act as electrical insulation layers 166 (see FIG. 15) for the surface treated molybdenum foil layers 122. The molybdenum composite hybrid laminate 100 is preferably used in a composite structure 104 (see FIG. 4), such as an aircraft structure 10 (see FIG. 1) and conducts electrical current 184 and provides the current return path 242 for lightning strikes 180 in the aircraft composite structure 104.

Figure 22:
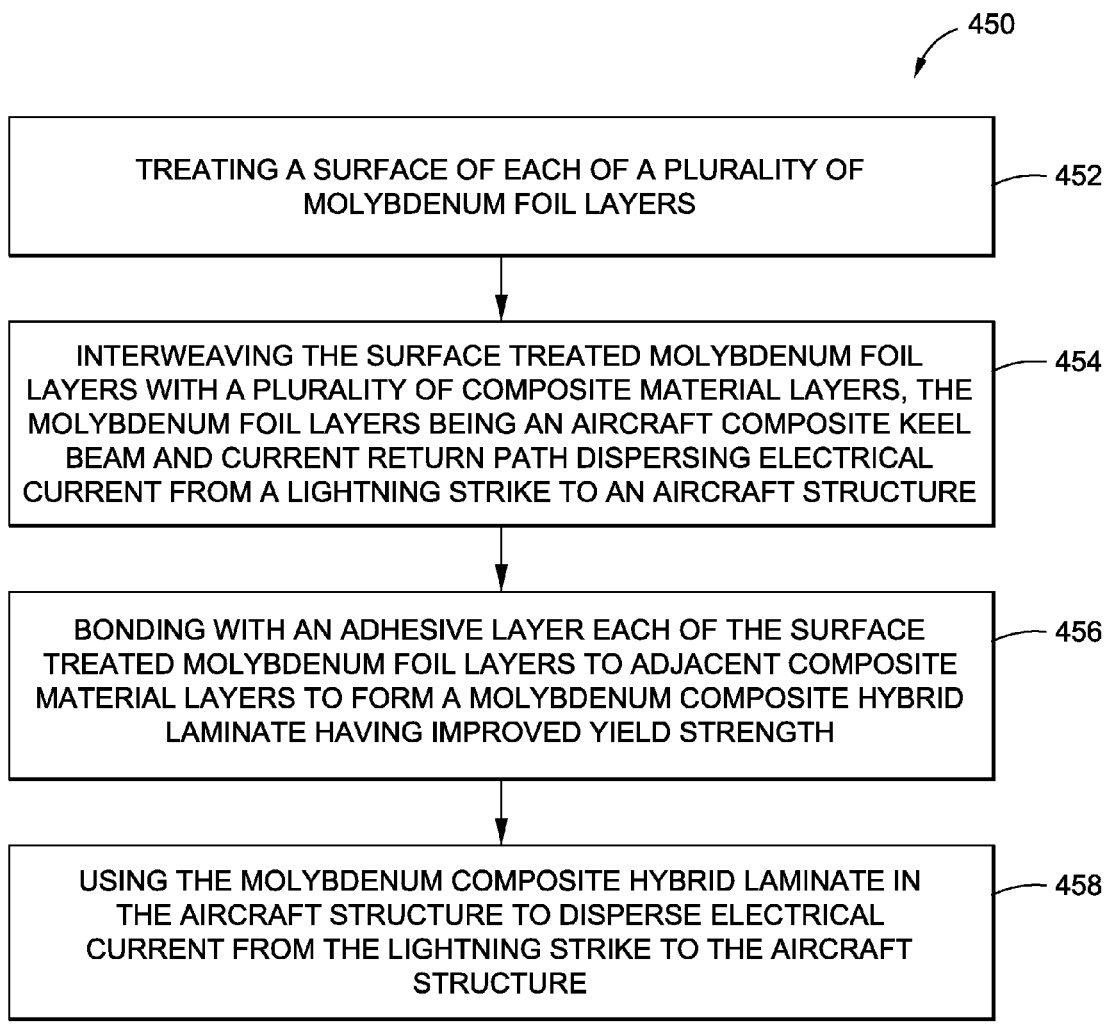

In another embodiment of the disclosure, there is provided a method 450 of fabricating into an aircraft structure 10 (see FIG. 1) an aircraft composite keel beam 240 (see FIG. 15) for dispersing electrical current 184 (see FIG. 15) from a lightning strike 180 (see FIG. 15). The method 450 uses molybdenum foil layers 122 (see FIG. 15). FIG. 22 is a flow diagram illustrating one of the exemplary embodiments of the method 450 of fabricating the aircraft composite keel beam 240. The method 450 comprises step 452 of treating a surface 125a or 125b (see FIG. 6) of each of a plurality of molybdenum foil layers 122. Treating the surface 125a or 125b of the molybdenum foil layers 122 may comprise one or more surface treatments comprising sol gel surface treatment, water based sol gel paint, grit blasting, sanding, sandblasting, solvent wiping, abrading, laser ablation, chemical cleaning, chemical etching, or another suitable surface treatment.

The method 450 further comprises step 454 of interweaving the surface treated molybdenum foil layers 122 with a plurality of composite material layers 106 (see FIG. 15). The molybdenum foil layers 122 act as both an aircraft composite keel beam 240 (see FIG. 15) and a current return path 242 (see FIG. 15) dispersing electrical current 184 from the lightning strike 180 to a composite structure 104 (see FIG. 4) such as an aircraft structure 10 (see FIG. 1). The molybdenum foil layers 122 have a sufficient molybdenum stiffness 124 (see FIG. 4) to leverage a fiber tensile strength 116 (see FIG. 4) and a fiber stiffness 118 (see FIG. 4) of off-axis fibers 110 (see FIG. 4) in adjacent composite material layers 106 via Poisson's effects in the molybdenum foil layers 122. The molybdenum foil layers 122 further have a sufficient molybdenum strength 126 (see FIG. 4), a sufficient molybdenum stiffness 124 (see FIG. 4), and a sufficient molybdenum electrical conductivity 128 (see FIG. 4) to enable the molybdenum foil layers 122 to act as the aircraft composite keel beam 240 (see FIG. 15) and the current return path 242 (see FIG. 15) for dispersing electrical current 184 (see FIG. 15) from the lightning strike 180 (see FIG. 15) to the aircraft structure 10 (see FIG. 1).

The method 450 further comprises step 456 of bonding with an adhesive layer 134 each of the surface treated molybdenum foil layers 122 to adjacent composite material layers 106 to form a molybdenum composite hybrid laminate 100 having improved yield strength 102 (see FIG. 4). The interweaving step 454 and bonding step 456 may further comprise one or more of compacting, consolidating, and curing the interweaved surface treated molybdenum foil layers 122 and the composite material layers 106. The method 450 further comprises step 458 of using the molybdenum composite hybrid laminate 100 in the composite structure 104, such as the aircraft structure 10 (see FIG. 1), to disperse electrical current 184 (see FIG. 15) from the lightning strike 180 to the composite structure 104, such as the aircraft structure 10.

In another embodiment of the disclosure, there is provided a molybdenum composite hybrid laminate 100 (see FIG. 10) to improve thermal impingement 190 (see FIG. 10) resistance of a composite structure 104 (see FIG. 4). FIG. 10 is an illustration of a schematic diagram of another one of the embodiments of the molybdenum composite hybrid laminate 100 of the disclosure where the surface treated molybdenum foil layers 122 act as both thermal energy dissipation paths 196 and thermal penetration barriers 198 improving thermal impingement 190 resistance to high thermal energy input 192 from a thermal impingement 190, such as a laser beam or X-ray. In this embodiment, the surface treated molybdenum foil layers 122 have a sufficient molybdenum thermal conductivity 130 (see FIG. 4) which is high that enables the surface treated molybdenum foil layers 122 to act as thermal energy dissipation paths 196 (see FIG. 10) for thermal energy flow 194 to improve thermal impingement 190 resistance of the composite structure 104 (see FIG. 4). In addition, the surface treated molybdenum foil layers 122 have a sufficient molybdenum melting point 132 (see FIG. 4) which is very high that enables the surface treated molybdenum foil layers 122 to act as thermal penetration barriers 198 (see FIG. 10) further improving thermal impingement 190 resistance of the composite structure 104. By using the surface treated molybdenum foil layers 122 as replacement layers in the composite structure 104, improved thermal impingement 190 resistance is achieved due to the very high molybdenum melting point 132 (see FIG. 4) and the high molybdenum thermal conductivity 130 (see FIG. 4) of the surface treated molybdenum foil layers 122. The surface treated molybdenum foil layers 122 provide significant thermal penetration barriers 198 to thermal impingement 190 or penetration of the composite structure 104 due to high molybdenum melting point 132 (see FIG. 4) and the high molybdenum thermal conductivity 130 (see FIG. 4) which provide dissipation of thermal energy input 192 (see FIG. 10) when applied in a localized area.

As shown in FIG. 10, each molybdenum composite hybrid laminate 100 for improving thermal impingement 190 resistance comprises a plurality of composite material layers 106 (see FIG. 10), and each composite material layer 106 comprises a fiber-reinforced polymeric material 108 (see FIG. 4). Preferably, the composite material layer 106 comprises a graphite/resin based material layer 164. The molybdenum composite hybrid laminate 100 further comprises a plurality of surface treated molybdenum foil layers 122 interweaved between the composite material layers 106. The surface treated molybdenum foil layers 122 have a sufficient molybdenum stiffness 124 (see FIG. 4) to leverage the fiber tensile strength 116 (see FIG. 4) and the fiber stiffness 118 (see FIG. 4) of the off-axis fibers 110 (see FIG. 4) in adjacent composite material layers 106 via Poisson's effects in the surface treated molybdenum foil layers 122. As shown in FIG. 10, the molybdenum composite hybrid laminate 100 further comprises a plurality of adhesive layers 134 (see FIG. 10) disposed between and bonding adjacent layers of the composite material layers 106 and the surface treated molybdenum foil layers 122. The adhesive layers 134 (see FIG. 10) may act as electrical insulation layers 166 (see FIG. 10) for the surface treated molybdenum foil layers 122. The molybdenum composite hybrid laminate 100 is preferably used in a composite structure 104 (see FIG. 4), such as an aircraft structure 10 (see FIG. 1) and improves thermal impingement 190 resistance of the composite structure 104.

Figure 24:
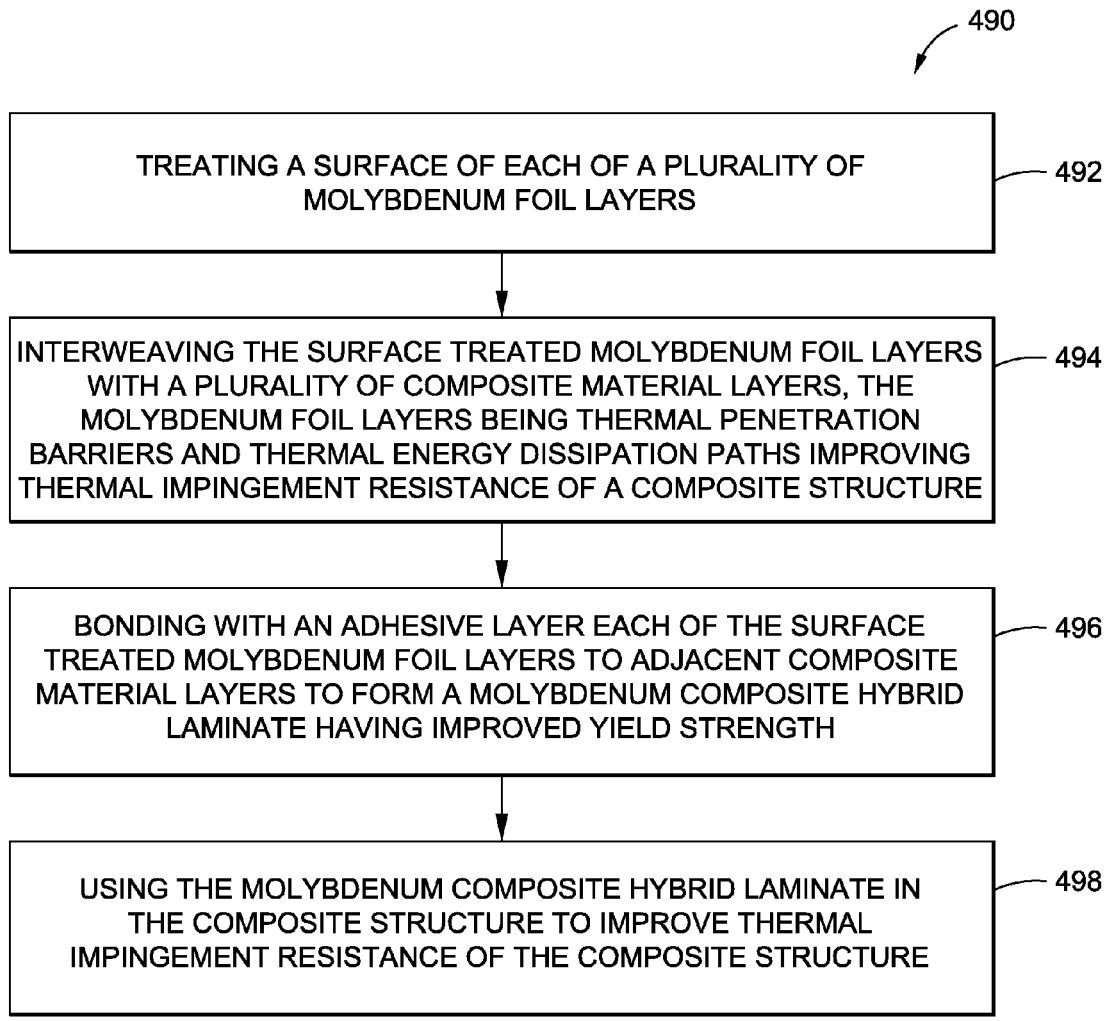

In another embodiment of the disclosure, there is provided a method 490 of improving thermal impingement 190 (see FIG. 10) resistance of a composite structure 104 using molybdenum foil layers 122 (see FIG. 10). FIG. 24 is a flow diagram illustrating one of the exemplary embodiments of the method 490 of improving thermal impingement 190 (see FIG. 10) resistance of the composite structure 104. The method 490 comprises step 492 of treating a surface 125a or 125b of each of a plurality of molybdenum foil layers 122 (see FIG. 10). Treating the surface 125a or 125b of the molybdenum foil layers 122 may comprise one or more surface treatments comprising sol gel surface treatment, water based sol gel paint, grit blasting, sanding, sandblasting, solvent wiping, abrading, laser ablation, chemical cleaning, chemical etching, or another suitable surface treatment.

The method 490 further comprises step 494 of interweaving the surface treated molybdenum foil layers 122 with a plurality of composite material layers 106 (see FIG. 10). The molybdenum foil layers 122 act as thermal penetration barriers 198 (see FIG. 10) and thermal energy dissipation paths 196 (see FIG. 10) improving thermal impingement 190 (resistance of a composite structure. The molybdenum foil layers 122 have a sufficient molybdenum stiffness 124 (see FIG. 4) to leverage a fiber tensile strength 116 (see FIG. 4) and a fiber stiffness 118 (see FIG. 4) of off-axis fibers 110 (see FIG. 4) in adjacent composite material layers 106 via Poisson's effects in the molybdenum foil layers 122. The molybdenum foil layers 122 further have a sufficient molybdenum melting point 132 (see FIG. 4) and a sufficient molybdenum thermal conductivity 130 (see FIG. 4) to enable the molybdenum foil layers 122 to act as thermal penetration barriers 198 (see FIG. 10) and thermal energy dissipation paths 196 (see FIG. 10) improving thermal impingement 190 (see FIG. 10) resistance of the composite structure 104 (see FIG. 4).

The method 490 further comprises step 496 of bonding with an adhesive layer 134 (see FIG. 10) each of the surface treated molybdenum foil layers 122 to adjacent composite material layers 106 to form a molybdenum composite hybrid laminate 100 (see FIG. 10) having improved yield strength 102 (see FIG. 4). The interweaving step 494 and bonding step 496 may further comprise one or more of compacting, consolidating, and curing the interweaved surface treated molybdenum foil layers 122 and the composite material layers 106. The method 490 further comprises step 498 of using the molybdenum composite hybrid laminate 100 in the composite structure 104 to improve thermal impingement 190 resistance of the composite structure 104.

In another embodiment of the disclosure, there is provided a molybdenum composite hybrid laminate 100 (see FIG. 11) to improve impact 200 (see FIG. 11) durability of a composite structure 104 (see FIG. 4). FIG. 11 is an illustration of a schematic diagram of another one of the embodiments of a molybdenum composite hybrid laminate 100 of the disclosure where the surface treated molybdenum foil layers 122 act as load dissipation paths 206 (see FIG. 11) for improved impact 200 durability. The surface treated molybdenum foil layers 122 have a sufficient molybdenum stiffness 124 which is very high and a sufficient molybdenum strength 126 which enables the surface treated molybdenum foil layers 122 to draw load 204 away from a point of impact 202 by an impact 200 source, such as, for example, hail strikes or bird strikes, thereby blunting the concentrated impact force. The surface treated molybdenum foil layers 122 spread the load 204 over a larger area along the surface treated molybdenum foil layers 122 improving impact durability and impact resistance of the composite structure 104. The composite material layers 106 (see FIG. 11) are spared the transfer of load 204 deep into the molybdenum composite hybrid laminate 100, thereby reducing detrimental effects associated with the point of impact 202. The use of the high stiffness and high strength surface treated molybdenum foil layers 122 enables much thinner gauges while also adding such benefits as improved lightning resistance and improved structural performance.

As shown in FIG. 11, each molybdenum composite hybrid laminate 100 for improving impact 200 durability comprises a plurality of composite material layers 106, and each composite material layer 106 comprises a fiber-reinforced polymeric material 108 (see FIG. 4). Preferably, the composite material layer 106 comprises a graphite/resin based material layer 164. The molybdenum composite hybrid laminate 100 further comprises a plurality of surface treated molybdenum foil layers 122 (see FIG. 11) interweaved between the composite material layers 106. The surface treated molybdenum foil layers 122 have a sufficient molybdenum stiffness 124 (see FIG. 4) to leverage the fiber tensile strength 116 (see FIG. 4) and the fiber stiffness 118 (see FIG. 4) of the off-axis fibers 110 (see FIG. 4) in adjacent composite material layers 106 via Poisson's effects in the surface treated molybdenum foil layers 122. The surface treated molybdenum foil layers 122 further have a sufficient molybdenum stiffness 124 (see FIG. 4) and a sufficient molybdenum strength 126 (see FIG. 4) to enable the surface treated molybdenum foil layers 122 to draw load 204 (see FIG. 11) away from the point of impact 202 (see FIG. 11) improving impact 200 durability. The molybdenum composite hybrid laminate 100 further comprises a plurality of adhesive layers 134 (see FIG. 11) disposed between and bonding adjacent layers of the composite material layers 106 and the surface treated molybdenum foil layers 122. The adhesive layers 134 (see FIG. 11) may act as insulation layers 166 (see FIG. 11) for the surface treated molybdenum foil layers 122. The molybdenum composite hybrid laminate 100 is preferably used in a composite structure 104 (see FIG. 4), such as an aircraft structure 10 (see FIG. 1), and improves impact durability of the composite structure 104.

Figure 26:
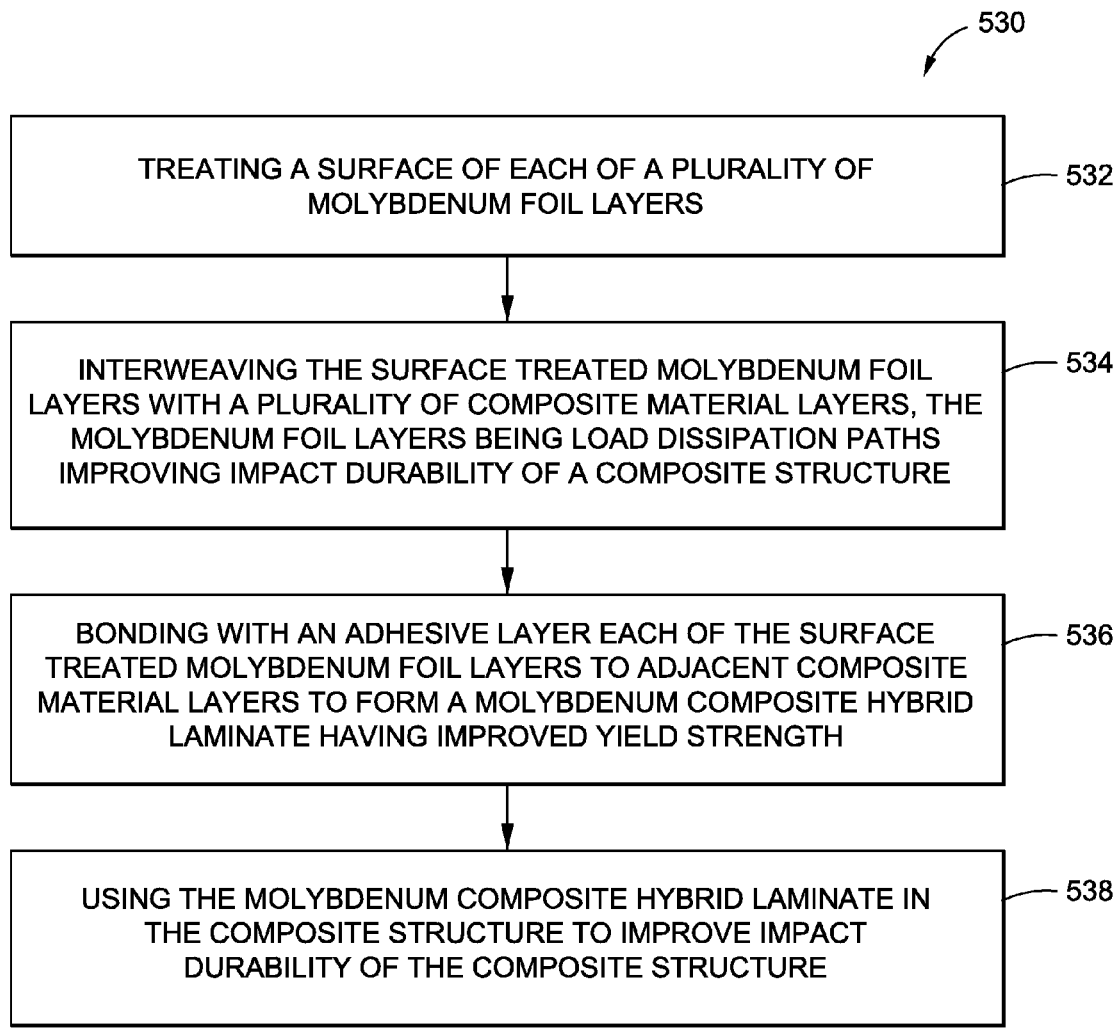

In another embodiment there is provided a method 530 of improving impact 200 (see FIG. 11) durability of a composite structure 104 (see FIG. 4) using molybdenum foil layers 122. FIG. 26 is a flow diagram illustrating one of the exemplary embodiments of the method 530 of improving impact durability. The method 530 comprises step 532 of treating a surface 125a or 125b (see FIG. 6) of each of a plurality of molybdenum foil layers 122 (see FIG. 11). Treating the surface 125a or 125b of the molybdenum foil layers 122 may comprise one or more surface treatments comprising sol gel surface treatment, water based sol gel paint, grit blasting, sanding, sandblasting, solvent wiping, abrading, laser ablation, chemical cleaning, chemical etching, or another suitable surface treatment.

The method 530 further comprises step 534 of interweaving the surface treated molybdenum foil layers 122 with a plurality of composite material layers 106 (see FIG. 11). The molybdenum foil layers 122 act as load dissipation paths 206 (see FIG. 11) improving impact durability at a point of impact 202 from an impact 200 source, such as hail strikes, bird strikes, or another impact source. The molybdenum foil layers 122 preferably improve resistance to impact 200 damage such as from hail strikes and bird strikes. The molybdenum foil layers 122 have a sufficient molybdenum stiffness 124 (see FIG. 4) to leverage a fiber tensile strength 116 (see FIG. 4) and a fiber stiffness 118 (see FIG. 4) of off-axis fibers 110 (see FIG. 4) in adjacent composite material layers 106 via Poisson's effects in the molybdenum foil layers 122. The molybdenum foil layers 122 further have a sufficient molybdenum stiffness 124 (see FIG. 4) and a sufficient molybdenum strength 126 (see FIG. 4) to enable the molybdenum foil layers 122 to act as load dissipation paths 206 (see FIG. 11) improving impact durability of the composite structure 104.

The method 530 further comprises step 536 of bonding with an adhesive layer 134 (see FIG. 11) each of the surface treated molybdenum foil layers 122 to adjacent composite material layers 106 to form a molybdenum composite hybrid laminate 100 (see FIG. 11) having improved yield strength 102 (see FIG. 4). The interweaving step 534 and bonding step 536 may further comprise one or more of compacting, consolidating, and curing the interweaved surface treated molybdenum foil layers 122 and the composite material layers 106. The method 530 further comprises step 538 of using the molybdenum composite hybrid laminate 100 in the composite structure 104 to improve impact durability of the composite structure 104. The composite structure 104 preferably comprises an aircraft structure 10 (see FIG. 10).

In another embodiment of the disclosure, there is provided a molybdenum composite hybrid laminate 100 to steer load 214 (see FIG. 12A) via main load paths 212a and secondary load paths 212b (see FIG. 12A) in a composite structure 104 (see FIG. 12A). FIG. 12A is an illustration of a schematic diagram of another one of the embodiments of a molybdenum composite hybrid laminate 100 of the disclosure showing the surface treated molybdenum foil layers 122 and composite material layer 106 of the composite structure 104 steering load 214 around a non-load bearing area 210, such as, for example, access holes, access panels, systems penetrations, and other design artifacts. FIG. 12A shows the non-load bearing area 210 with a system penetration element 211. FIG. 12B is an illustration of a schematic diagram of a cross-section taken at lines 12B-12B of FIG. 12A. FIG. 12B shows the non-load bearing area 210 with the system penetration element 211, the composite material layer 106 of the composite structure 104, and the surface treated molybdenum foil layers 122 acting as load steering paths 215. When non-load bearing areas 210, such as access holes, systems penetrations, or other suitable design artifacts, are needed in composite structures, it is necessary to pad-up the lay up of the composite structure 104 to facilitate the flow of load 214 around these non-load bearing areas 210. The surface treated molybdenum foil layers 122 have a sufficient molybdenum stiffness 124 (see FIG. 4) which is high and a sufficient molybdenum strength 126 (see FIG. 4) which is high to enable the surface treated molybdenum foil layers 122 to steer load 214 in load steering paths 215 (see FIG. 12B) around the non-load bearing area 210 in the composite structure 104. The surface treated molybdenum foil layers 122 have a very high molybdenum stiffness 124 (see FIG. 4) and a very high molybdenum strength 126 (see FIG. 4) and will draw load 214 and reinforce the non-load bearing areas 210, such as, access holes, systems penetrations, and other design artifacts, without needing to add additional thickness to the composite structure 104. The surface treated molybdenum foil layers 122 enable the load 214 to travel in efficient, thin, customized load steering paths 215. The efficiency may provide optimal advantages with respect to cost, part volume, and weight of the composite structure 104.

Each molybdenum composite hybrid laminate 100 for steering load 214 around the non-load bearing areas 210 in the composite structure 104 comprises a plurality of composite material layers 106, and each composite material layer 106 comprises a fiber-reinforced polymeric material 108 (see FIG. 4). Preferably, the composite material layer 106 comprises a graphite/resin based material layer. The molybdenum composite hybrid laminate 100 further comprises a plurality of surface treated molybdenum foil layers 122 interweaved between the composite material layers 106. The surface treated molybdenum foil layers 122 have a sufficient molybdenum stiffness 124 (see FIG. 4) to leverage the fiber tensile strength 116 (see FIG. 4) and the fiber stiffness 118 (see FIG. 4) of the off-axis fibers 110 (see FIG. 4) in adjacent composite material layers 106 via Poisson's effects in the surface treated molybdenum foil layers 122. The surface treated molybdenum foil layers 122 further have a sufficient molybdenum stiffness 124 (see FIG. 4) and a sufficient molybdenum strength 126 (see FIG. 4) to enable the surface treated molybdenum foil layers 122 to steer load 214 in load steering paths 215 around non-load bearing areas 210 (see FIG. 12A). The molybdenum composite hybrid laminate 100 further comprises a plurality of adhesive layers 134 disposed between and bonding adjacent layers of the composite material layers 106 and the surface treated molybdenum foil layers 122. The molybdenum composite hybrid laminate 100 is preferably used in a composite structure 104 (see FIG. 4), such as an aircraft structure 10 (see FIG. 1), and steers load 214 around non-load bearing areas 210 in the composite structure 104.

Figure 27:
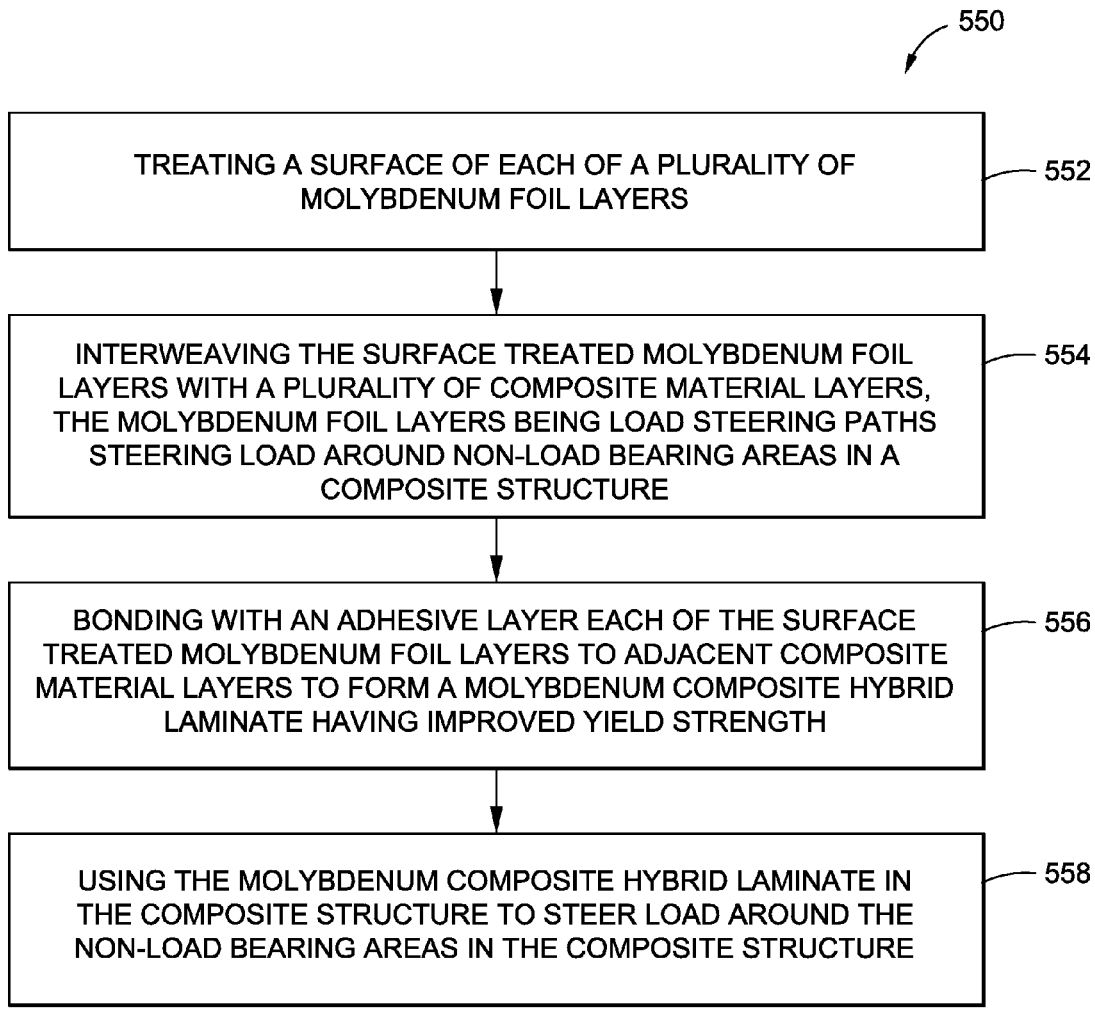

In another embodiment of the disclosure, there is provided a method 550 of steering load 214 (see FIG. 12A) around non-load bearing areas 210 (see FIG. 12A) in a composite structure 104 (see FIG. 4) using molybdenum foil layers 122. FIG. 27 is a flow diagram illustrating one of the exemplary embodiments of the method 550 of steering load 214 around non-load bearing areas 210. The non-load bearing areas 210 may comprise access holes, access panels, systems penetrations, or other suitable design artifacts. The method 550 comprises step 552 of treating a surface 125a or 125b (see FIG. 6) of each of a plurality of molybdenum foil layers 122 (see FIG. 12A). Treating the surface 125a or 125b of the molybdenum foil layers 122 may comprise one or more surface treatments comprising sol gel surface treatment, water based sol gel paint, grit blasting, sanding, sandblasting, solvent wiping, abrading, laser ablation, chemical cleaning, chemical etching, or another suitable surface treatment.

The method 550 further comprises step 554 of interweaving the surface treated molybdenum foil layers 122 (see FIG. 12A) with a plurality of composite material layers 106. The molybdenum foil layers 122 act as load steering paths 215 (see FIGS. 12A-B) steering load 214 around non-load bearing areas 210 in the composite structure 104. The molybdenum foil layers 122 have a sufficient molybdenum stiffness 124 (see FIG. 4) to leverage a fiber tensile strength 116 (see FIG. 4) and a fiber stiffness 118 (see FIG. 4) of off-axis fibers 110 (see FIG. 4) in adjacent composite material layers 106 via Poisson's effects in the molybdenum foil layers 122. The molybdenum foil layers 122 further have a sufficient molybdenum stiffness 124 (see FIG. 4) and a sufficient molybdenum strength 126 (see FIG. 4) to enable the molybdenum foil layers 122 to act as load steering paths 215 steering load 214 around non-load bearing areas 210 in the composite structure 104.

The method 550 further comprises step 556 of bonding with an adhesive layer 134 (see FIG. 4) each of the surface treated molybdenum foil layers 122 to adjacent composite material layers 106 to form a molybdenum composite hybrid laminate 100 (see FIG. 12A) having improved yield strength 102 (see FIG. 4). The interweaving step 554 and bonding step 556 may further comprise one or more of compacting, consolidating, and curing the interweaved surface treated molybdenum foil layers 122 and the composite material layers 106. The method 550 further comprises step 558 of using the molybdenum composite hybrid laminate 100 in the composite structure 104 to steer load 214 around the non-load bearing areas 210 in the composite structure 104.

In another embodiment of the disclosure, there is provided a molybdenum composite hybrid laminate 100 to improve a cure cycle, such as to improve cure cycle characteristics, of a composite structure 104 (see FIG. 13). FIG. 13 is an illustration of a schematic diagram of another one of the embodiments of a molybdenum composite hybrid laminate 100 of the disclosure where the surface treated molybdenum foil layers 122 act as thermal and temperature controllers 226 for improved cure cycle, such as improved cure cycle characteristics. Thermal and temperature uniformity and the ability to control excessive thermal energy due to cure kinetics of the resins can be important fabrication issues when curing thermosetting composites. FIG. 13 shows excess thermal energy 222 being generated in a cure area 220 as the cure in the cure area 220 advances at a more rapid rate. The excess thermal energy 222 is conducted away rapidly along thermal energy flow paths 224, thereby reducing the risk of thermal over shooting. The surface treated molybdenum foil layers 122 have a sufficient molybdenum thermal conductivity 130 (see FIG. 4) which is high to enable the surface treated molybdenum foil layers 122 to act as thermal and temperature controllers 226 improving the cure cycle, such as improving cure cycle characteristics, of the composite structure 104 (see FIG. 4). Cure cycle characteristics may comprise a cure cycle length, a cure cycle thermal leveling, a cure cycle temperature leveling, a cure cycle thermal control, a cure cycle temperature control, or another suitable cure cycle characteristic.

The high molybdenum thermal conductivity 130 (see FIG. 4) enables the surface treated molybdenum foil layers 122 to perform well structurally while assisting in controlling or leveling out the thermal uniformity and temperature for improved cure cycle, such as improved cure cycle characteristics. The surface treated molybdenum foil layers 122 may improve the overall cure cycle length and thermal robustness due to its excellent molybdenum thermal conductivity 130 (see FIG. 4), thus, reducing overall costs of fabrication. The excellent molybdenum thermal conductivity 130 (see FIG. 4) provides improved thermal and temperature control or leveling in the composite structure 104 (see FIG. 4) and enables more robust fabrication processing cycles. The curing and structurally advantageous characteristics of the surface treated molybdenum foil layers 122 (see FIG. 13) may be tailored to provide an optimum solution.

As shown in FIG. 13, each molybdenum composite hybrid laminate 100 comprises a plurality of composite material layers 106, and each composite material layer 106 comprises a fiber-reinforced polymeric material 108 (see FIG. 4). Preferably, the composite material layer 106 comprises a graphite/resin based material layer. As shown in FIG. 13, the molybdenum composite hybrid laminate 100 further comprises a plurality of surface treated molybdenum foil layers 122 interweaved between the composite material layers 106. The surface treated molybdenum foil layers 122 have a sufficient molybdenum stiffness 124 (see FIG. 4) to leverage the fiber tensile strength 116 (see FIG. 4) and the fiber stiffness 118 (see FIG. 4) of the off-axis fibers 110 (see FIG. 4) in adjacent composite material layers 106 via Poisson's effects in the surface treated molybdenum foil layers 122. The surface treated molybdenum foil layers 122 further have a sufficient molybdenum stiffness 124 (see FIG. 4) and a sufficient molybdenum strength 126 (see FIG. 4) to enable the surface treated molybdenum foil layers 122 to act as thermal and temperature controllers 226 improving a cure cycle, such as improving cure cycle characteristics, of the composite structure 104. The molybdenum composite hybrid laminate 100 further comprises a plurality of adhesive layers 134 (see FIG. 13) disposed between and bonding adjacent layers of the composite material layers 106 and the surface treated molybdenum foil layers 122. The adhesive layers 134 (see FIG. 13) may act as insulation layers 166 (see FIG. 13) for the surface treated molybdenum foil layers 122. The molybdenum composite hybrid laminate 100 is preferably used in a composite structure 104 (see FIG. 4), such as an aircraft structure 10 (see FIG. 1).

Figure 25:
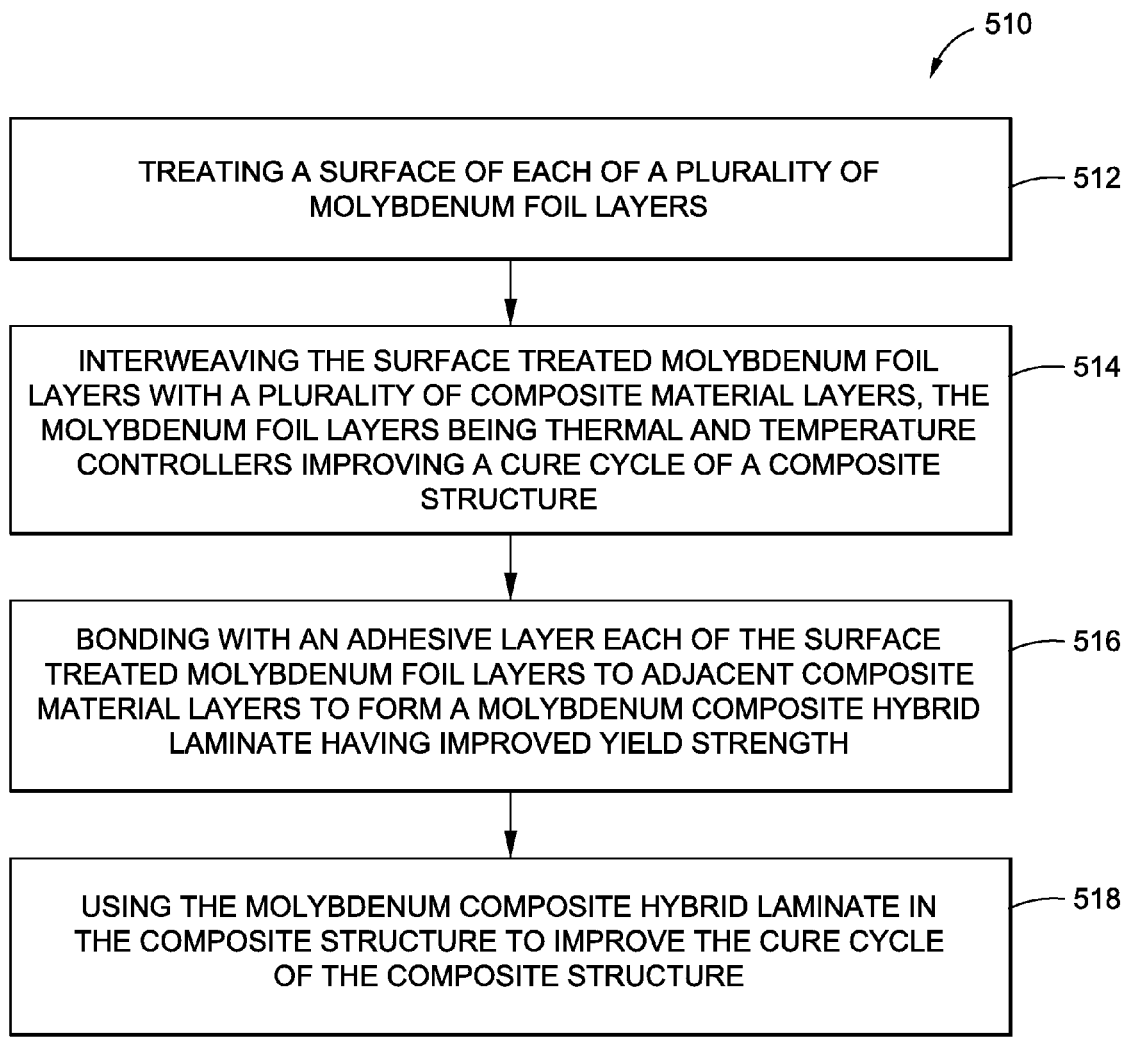

In another embodiment of the disclosure, there is provided a method 510 of improving a cure cycle of a composite structure 104 (see FIG. 4) using molybdenum foil layers 122 (see FIG. 13). FIG. 25 is a flow diagram illustrating one of the exemplary embodiments of the method 510 of improving the cure cycle. The method 510 comprises step 512 of treating a surface 125a or 125b (see FIG. 6) of each of a plurality of molybdenum foil layers 122. Treating the surface 125a or 125b of the molybdenum foil layers 122 may comprise one or more surface treatments comprising sol gel surface treatment, water based sol gel paint, grit blasting, sanding, sandblasting, solvent wiping, abrading, laser ablation, chemical cleaning, chemical etching, or another suitable surface treatment.

The method 510 further comprises step 514 of interweaving the surface treated molybdenum foil layers 122 with a plurality of composite material layers 106 (see FIG. 13). The molybdenum foil layers 122 act as thermal and temperature controllers 224 (see FIG. 13) improving the cure cycle of a composite structure 104 (see FIG. 4). The molybdenum foil layers 122 have a sufficient molybdenum stiffness 124 (see FIG. 4) to leverage a fiber tensile strength 116 (see FIG. 4) and a fiber stiffness 118 (see FIG. 4) of off-axis fibers 110 (see FIG. 4) in adjacent composite material layers 122 via Poisson's effects in the molybdenum foil layers 122. The molybdenum foil layers 122 further have a sufficient molybdenum thermal conductivity 130 (see FIG. 4) to enable the molybdenum foil layers 122 to act as thermal and temperature controllers 226 (see FIG. 13) improving the cure cycle of the composite structure 104 (see FIG. 4). The molybdenum foil layers 122 act as thermal and temperature controllers 226 to improve the cure cycle, such as improving cure cycle characteristics comprising a cure cycle length, a cure cycle thermal leveling, a cure cycle temperature leveling, a cure cycle thermal control, a cure cycle temperature control, or another suitable cure cycle characteristic.

The method 510 further comprises step 516 of bonding with an adhesive layer 134 (see FIG. 13) each of the surface treated molybdenum foil layers 122 to adjacent composite material layers 106 to form a molybdenum composite hybrid laminate 100 (see FIG. 13) having improved yield strength 102 (see FIG. 4). The interweaving step 514 and bonding step 516 may further comprise one or more of compacting, consolidating, and curing the interweaved surface treated molybdenum foil layers 122 and the composite material layers 106. The method 510 further comprises step 518 of using the molybdenum composite hybrid laminate 100 in the composite structure 104 to improve the cure cycle of the composite structure 104.

In other embodiments of the disclosure, there are provided molybdenum composite hybrid laminates 100 to draw load 234 (see FIGS. 14A, 14C)) via main load paths 232a and secondary load paths 232b (see FIGS. 14A, 14C) in a composite structure 104 (see FIGS. 14A, 14C) and to reinforce repair areas 230 (see FIGS. 14A, 14C), such as, for example, holes, weakened areas, damaged areas, and other areas requiring repair, in a composite structure 104. FIG. 14A is an illustration of a schematic diagram of another one of the embodiments of a molybdenum composite hybrid laminate 100 of the disclosure showing the surface treated molybdenum foil layers 122 of the composite structure 104 reinforcing a patch repair area 230a, For purposes of this application, a patch repair means a type of bonded repair in which replacement material is inserted to fill a damaged area. FIG. 14B is an illustration of a schematic diagram of a cross-section taken at lines 14B-14B of FIG. 14A. FIG. 14C is an illustration of a schematic diagram of another one of the embodiments of a molybdenum composite hybrid laminate 100 of the disclosure showing the surface treated molybdenum foil layers 122 of the composite part 104 reinforcing a scarf repair area 230b. For purposes of this application, a scarf repair means a type of bonded repair in which a damaged area is sanded to produce a tapering effect and then replacement material is laid over the damaged area. FIG. 14D is an illustration of a schematic diagram of a cross-section taken at lines 14D-14D of FIG. 14C.

FIGS. 14A-14B show the surface treated molybdenum foil layers 122 acting as load drawing paths 235 to draw load 234 (see FIG. 14A) away from the repair area 230, for example, the patch repair area 230a and provide a reinforcement element 236 of the repair area 230, for example, the patch repair area 230a. FIGS. 14C-14D show the surface treated molybdenum foil layers 122 acting as load drawing paths 235 to draw load 234 (see FIG. 14C) away from the repair area 230, for example, the scarf repair area 230b and provide a reinforcement element 236 of the repair area 230, for example, the scarf repair area 230b. By using the surface treated molybdenum foil layers 122 as part of the composite structure 104, the surface treated molybdenum foil layers 122 enable the load 234 to travel in efficient, thin, customized load drawing paths 235 (see FIGS. 14B, 14D). The high molybdenum strength 126 (see FIG. 4) and high molybdenum stiffness 124 (see FIG. 4) of the surface treated molybdenum foil layers 122 enable thinner, customized load drawing paths 235 for more efficient and thinner repairs, without needing to add significant additional thickness to the composite structure 104. In addition, the surface treated molybdenum foil layers 122 acting as load drawing paths 235 to draw load 234 and provide reinforcement elements 236 to repair areas 230, such as patch repair areas (230a) and scarf repair areas (230b), provide for more effective and efficient repairs of composite structures 104, less aerodynamic drag of vehicles with such composite structures 104, and improved appearance of the composite structures 104.

Each molybdenum composite hybrid laminate 100 for reinforcing and drawing load 234 (FIGS. 14A, 14C) away from a repair area 230 (FIGS. 14A-14D) comprises a plurality of composite material layers 106. Each composite material layer 106 comprises a fiber-reinforced polymeric material 108 (see FIG. 4). Preferably, the composite material layer 106 comprises a graphite/resin based material layer. The molybdenum composite hybrid laminate 100 further comprises a plurality of surface treated molybdenum foil layers 122 interweaved between the composite material layers 106. As discussed above, the surface treated molybdenum foil layers 122 have a sufficient molybdenum stiffness 124 (see FIG. 4) to leverage the fiber tensile strength 116 (see FIG. 4) and the fiber stiffness 118 (see FIG. 4) of the off-axis fibers 110 (see FIG. 4) in adjacent composite material layers 106 via Poisson's effects in the surface treated molybdenum foil layers 122. The surface treated molybdenum foil layers 122 have a sufficient molybdenum stiffness 124 (see FIG. 4) and a sufficient molybdenum strength 126 (see FIG. 4) to enable the surface treated molybdenum foil layers 122 to act as load drawings paths 235 (see FIGS. 14B, 14D) to draw load 234 away from a repair area 230 and provide reinforcement elements 236 to the repair areas 230 in the composite structure 104. The molybdenum composite hybrid laminate 100 further comprises a plurality of adhesive layers 134 disposed between and bonding adjacent layers of the composite material layers 106 and the surface treated molybdenum foil layers 122. The molybdenum composite hybrid laminate 100 is preferably used in a composite structure 104 (see FIGS. 14A, 14C), such as an aircraft structure (see FIG. 1), and reinforces repair areas in the composite structure 104.

Figure 28:
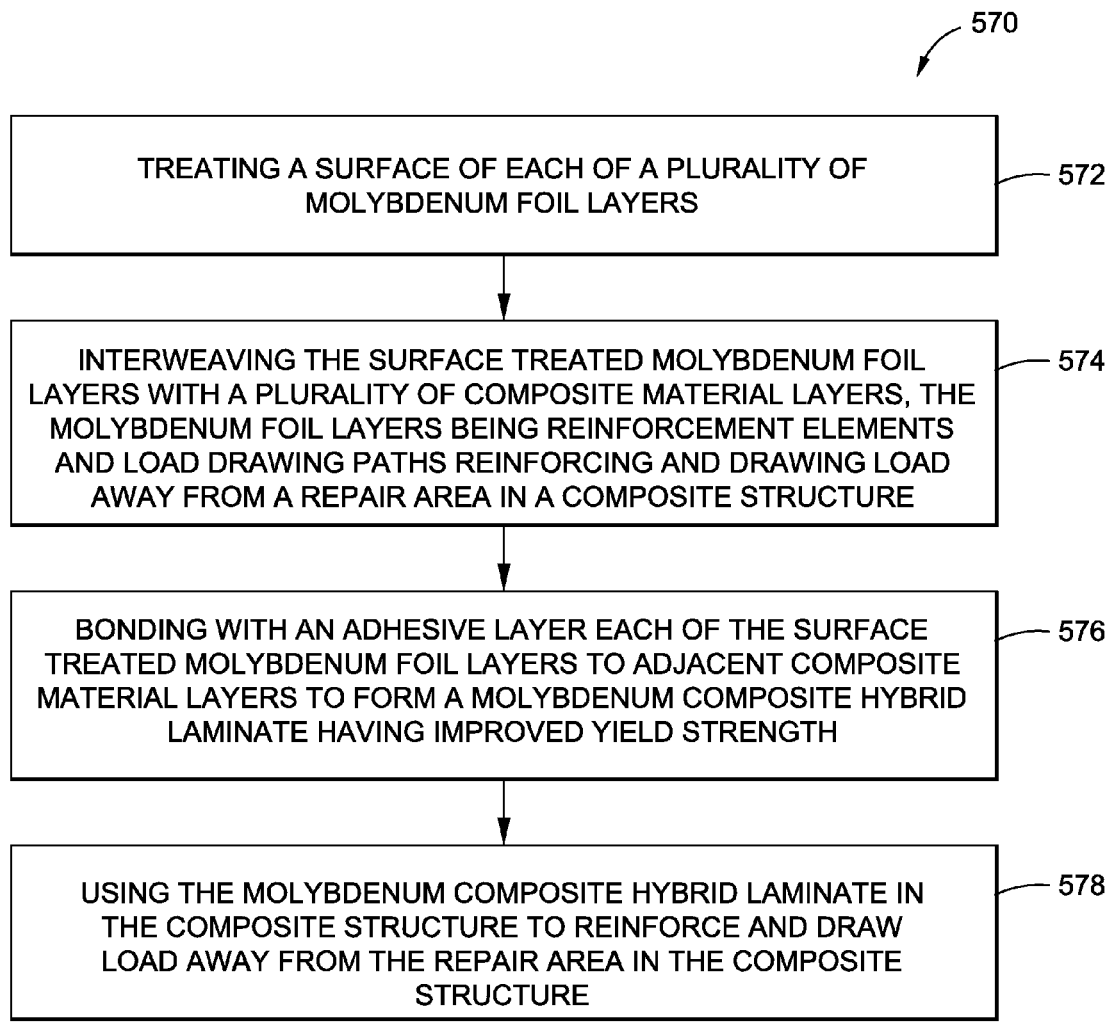

In another embodiment of the disclosure, there is provided a method 570 of reinforcing and drawing load 234 (FIGS. 14A, 14C) away from a repair area 230 (FIGS. 14A-14D) in a composite structure 104 using molybdenum foil layers 122 (FIGS. 14A-14D). FIG. 28 is a flow diagram illustrating one of the exemplary embodiments of the method 570 of reinforcing and drawing load 234 (FIGS. 14A, 14C) away from the repair area 230 (FIGS. 14A-14D). The repair area 230 may comprise a patch repair area 230a (see FIGS. 14A-14B), a scarf repair area 230b (see FIGS. 14C-14D), holes, weakened areas, damaged areas or another repair area.

The method 570 comprises step 572 of treating a surface 125a or 125b (see FIG. 6) of each of a plurality of molybdenum foil layers 122. Treating the surface 125a or 125b of the molybdenum foil layers 122 may comprise one or more surface treatments comprising sol gel surface treatment, water based sol gel paint, grit blasting, sanding, sandblasting, solvent wiping, abrading, laser ablation, chemical cleaning, chemical etching, or another suitable surface treatment.

The method 570 further comprises step 574 of interweaving the surface treated molybdenum foil layers 122 with a plurality of composite material layers 106. The molybdenum foil layers 122 act as reinforcement elements 236 (FIGS. 14A-14D) and load drawing paths 235 (FIGS. 14A-14D) reinforcing and drawing load 234 (FIGS. 14A, 14C) away from a repair area 230 (FIGS. 14A-14D) in a composite structure 104. The molybdenum foil layers 122 have a sufficient molybdenum stiffness 124 (see FIG. 4) to leverage a fiber tensile strength 116 (see FIG. 4) and a fiber stiffness 118 (see FIG. 4) of off-axis fibers 110 (see FIG. 4) in adjacent composite material layers 106 via Poisson's effects in the molybdenum foil layers 122. The molybdenum foil layers 122 further have a sufficient molybdenum stiffness 124 (see FIG. 4) and a sufficient molybdenum strength 126 (see FIG. 4) to enable the molybdenum foil layers 122 to reinforce and draw load 234 away from the repair area 230 in the composite structure 104.

The method 570 further comprises step 576 of bonding with an adhesive layer 134 (see FIG. 4) each of the surface treated molybdenum foil layers 122 to adjacent composite material layers 106 to form a molybdenum composite hybrid laminate 100 (see FIGS. 14A-14D) having improved yield strength 102 (see FIG. 4). The interweaving step 574 and bonding step 576 may further comprise one or more of compacting, consolidating, and curing the interweaved surface treated molybdenum foil layers 122 and the composite material layers 106. The method 570 further comprises step 578 of using the molybdenum composite hybrid laminate 10 in the composite structure 104 to reinforce and draw load 534 away from the repair area 230 in the composite structure 104.

In another embodiment of the disclosure, there is provided a molybdenum composite hybrid laminate 100 (see FIG. 18) to mitigate or eliminate areas of fiber distortion 268 (see FIG. 17) in a composite structure 104 using molybdenum foil layers 122 (see FIG. 18). FIG. 17 is an illustration of a schematic diagram of a composite structure 104 having areas of fiber distortion 268. FIG. 17 shows a pre-cured or cured composite structure 260 having fibers 262 and having a T-shaped configuration and a non-uniform cross section. FIG. 17 further shows the pre-cured or cured composite structure 260 joined to a composite structure 104, such as an uncured composite structure 264 having fibers 266 and having a uniform cross section. Where the pre-cured or cured composite structure 260 is joined to the uncured composite structure 264, differences in pressure between the pre-cured or cured composite structure 260 and the uncured composite structure 264 may produce wrinkling of composite material layers 106 and bow waves of fibers 266 which may result in areas of fiber distortion 268 (see FIG. 17).

FIG. 18 is an illustration of a schematic diagram of another one of the embodiments of a molybdenum composite hybrid laminate 100 of the disclosure where the molybdenum foil layers 122 act as fiber stabilizers 270 to mitigate or eliminate the areas of fiber distortion 268 (see FIG. 17). FIG. 18 shows the pre-cured or cured composite structure 260 having fibers 262, and having a T-shaped configuration and a non-uniform cross section. FIG. 18 further shows the pre-cured or cured composite structure 260 joined to a composite structure 104, such as an uncured composite structure 264 having fibers 266 and having a uniform cross section. In this embodiment, the surface treated molybdenum foil layers 122 (see FIG. 18) may be added to the uncured composite structure 264 where the pre-cured or cured composite structure 260 is joined to the uncured composite structure 264. The surface treated molybdenum foil layers 122 have a sufficient molybdenum stiffness 124 (see FIG. 4) and a sufficient molybdenum strength 126 (see FIG. 4) to enable the surface treated molybdenum foil layers 122 (see FIG. 18) to act as fiber stabilizers 270 (see FIG. 18) mitigating or eliminating fiber distortion 268 (see FIG. 17) in the composite structure 104 (see FIG. 18), such as the uncured composite structure 264, and resulting in stabilized fibers 272 (see FIG. 18) in the composite structure 104. In particular, the additional molybdenum stiffness 124 mitigates or eliminates the bow waves of fibers 266 (see FIG. 17), which in turn, mitigates or eliminates areas of fiber distortion 268 (see FIG. 17). Further, the surface treated molybdenum foil layers 122 have a sufficient molybdenum stiffness 124 (see FIG. 4) to leverage a fiber tensile strength 116 (see FIG. 4) and a fiber stiffness 118 (see FIG. 4) of off-axis fibers 110 (see FIG. 4) in adjacent composite material layers 106 (see FIG. 18) via Poisson's effects in the surface treated molybdenum foil layers 122.

Each molybdenum composite hybrid laminate 100 (see FIG. 18) comprises a plurality of composite material layers 106 (see FIG. 18), and each composite material layer 106 comprises a fiber-reinforced polymeric material 108 (see FIG. 4). Preferably, the composite material layer 106 comprises a graphite/resin based material layer. The molybdenum composite hybrid laminate 100 further comprises one or more surface treated molybdenum foil layers 122 interweaved between the composite material layers 106. The molybdenum composite hybrid laminate 100 further comprises one or more adhesive layers 134 (see FIG. 18) disposed between and bonding adjacent layers of the composite material layers 106 and the surface treated molybdenum foil layers 122. The molybdenum composite hybrid laminate 100 may be used in a composite structure 104 and mitigates or eliminates areas of fiber distortion 268 in the composite structure 104.

Figure 29:
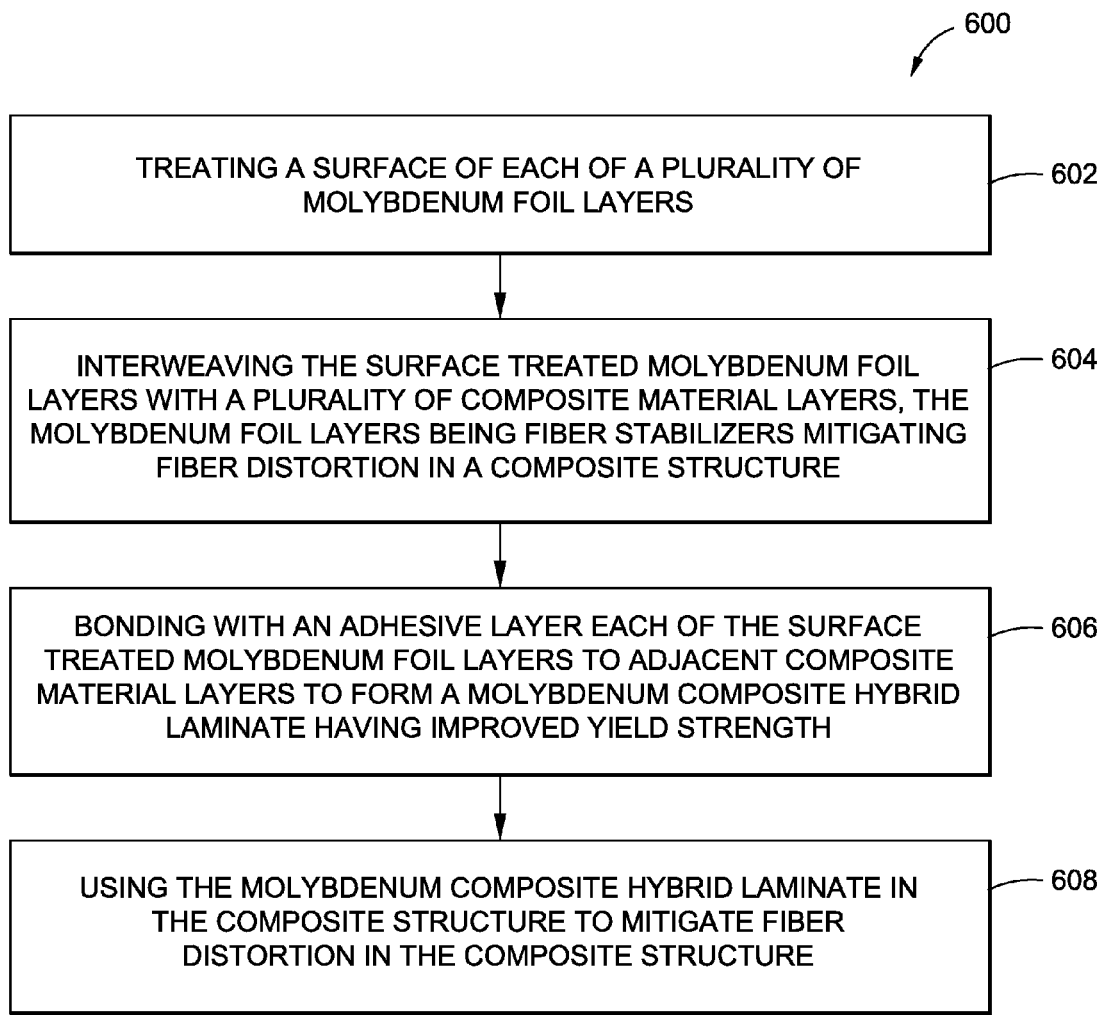

In another embodiment there is provided a method 600 of mitigating fiber distortion in a composite structure 104 using molybdenum foil layers 122. FIG. 29 is a flow diagram illustrating one of the exemplary embodiments of the method 600 for mitigating fiber distortion. The method 600 comprises step 602 of treating a surface 125a or 125b (see FIG. 6) of each of a plurality of molybdenum foil layers 122. Treating the surface 125a or 125b of the molybdenum foil layers 122 may comprise one or more surface treatments comprising sol gel surface treatment, water based sol gel paint, grit blasting, sanding, sandblasting, solvent wiping, abrading, laser ablation, chemical cleaning, chemical etching, or another suitable surface treatment.

The method 600 further comprises step 604 of interweaving the surface treated molybdenum foil layers 122 with a plurality of composite material layers 106. The molybdenum foil layers 122 act as fiber stabilizers 270 (see FIG. 18) mitigating fiber distortion 268 (see FIG. 17) in a composite structure 104. The molybdenum foil layers 122 have a sufficient molybdenum stiffness 124 to leverage a fiber tensile strength 116 and a fiber stiffness 118 of off-axis fibers 110 in adjacent composite material layers 106 via Poisson's effects in the molybdenum foil layers 122. The molybdenum foil layers 122 further have a sufficient molybdenum stiffness 124 and a sufficient molybdenum strength 126 to enable the molybdenum foil layers 122 to act as fiber stabilizers 270 mitigating fiber distortion 268 in the composite structure 104.

The method 600 further comprises step 606 of bonding with an adhesive layer 134 each of the surface treated molybdenum foil layers 122 to adjacent composite material layers 106 to form a molybdenum composite hybrid laminate 100 (see FIG. 18) having improved yield strength 102 (see FIG. 4). The interweaving step 604 and the bonding step 606 may further comprise one or more of compacting, consolidating, and curing the interweaved surface treated molybdenum foil layers 122 and the composite material layers 106. The method 600 further comprises step 608 of using the molybdenum composite hybrid laminate 100 in the composite structure 104 to mitigate fiber distortion 268 in the composite structure 104.

Figure 19:
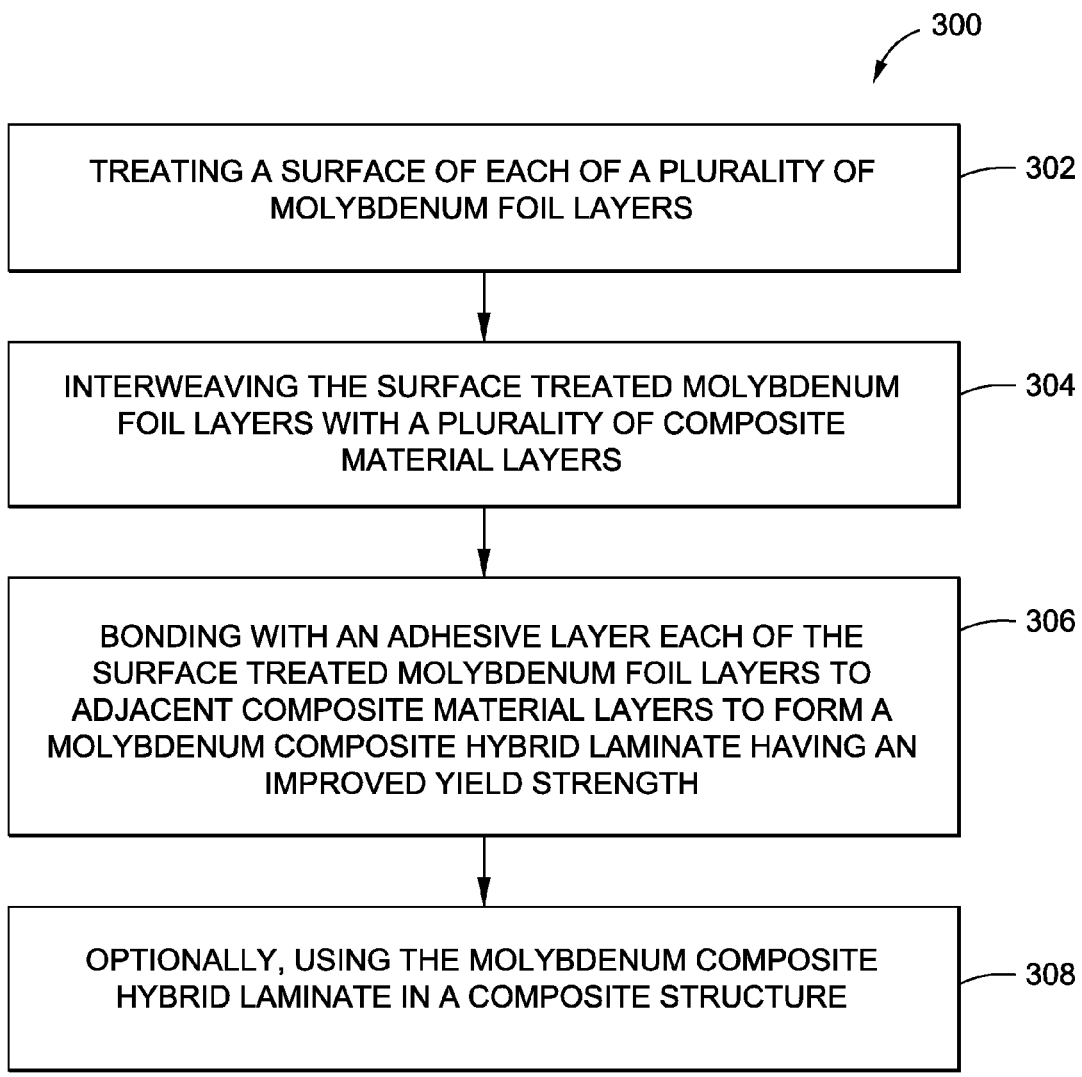

FIG. 19 is a flow diagram illustrating one of the exemplary embodiments of a method 300 of forming a molybdenum composite hybrid laminate 100 (see FIG. 4) or a molybdenum laminate lay up 101 or 150 (see FIGS. 5-6). The method 300 comprises step 302 of treating a surface 125*a* or 125*b* (see FIG. 6) of each of a plurality of molybdenum foil layers 122 or of each of a plurality of molybdenum foils 123 (see FIG. 6). The molybdenum foil layer 122 or molybdenum foil 123 is preferably surface treated to improve bonding between the molybdenum foil layer 122 or molybdenum foil 123 and an adjacent composite material layer 106 (see FIG. 4). The surface 125*a* or 125*b* of the molybdenum foil layer 122 or molybdenum foil 123 may be treated with a surface treatment process comprising sol gel surface treatment, water based sol gel paint, grit blasting, sanding, sandblasting, solvent wiping, abrading, laser ablation, chemical cleaning, chemical etching, or another suitable surface treatment process.

The method 300 further comprises step 304 of interweaving the surface treated molybdenum foil layers 122 with a plurality of composite material layers 106. Preferably, each composite material layer 106 comprises a fiber-reinforced polymeric material 108 (see FIGS. 4, 5). Preferably, the composite material layer 106 comprises a graphite/resin based material layer. The surface treated molybdenum foil layers 122 leverage the fiber tensile strength 116 (see FIG. 4) and the fiber stiffness 118 (see FIG. 4) of the off-axis fibers 110 (see FIG. 4) in adjacent composite material layers 106 via Poisson's effects in the surface treated molybdenum foil layers 122. In an embodiment with the molybdenum laminate layup 101 (see FIG. 5), two or more of the composite material layers 106 may each have a cutout portion 144 (see FIG. 5) comprising surface treated molybdenum foil 123, and for this embodiment, the method 300 may further comprise staggering interior edges 148 (see FIG. 5) of the cutout portions 144 to prevent an overlay of two or more interior edges 148 in order to provide improved load distribution by the molybdenum foil 123.

The method 300 further comprises step 306 of bonding with an adhesive layer 134 (see FIG. 4) each of the surface treated molybdenum foil layers 122 to adjacent composite material layers 106 to form the molybdenum composite hybrid laminate 100 having improved yield strength 102 (see FIG. 4). In an embodiment with the molybdenum laminate layup 101 (see FIG. 5), the method 300 may further comprise bonding with an adhesive layer 134 each of the surface treated molybdenum foils 123 of the molybdenum foil containing layers 146 to adjacent composite material layers 106 to form the molybdenum laminate layup 101. The interweaving step 304 and/or bonding step 306 of the method 300 may further comprise one or more of compacting, consolidating, and curing the interweaved surface treated molybdenum foil layers 122 or molybdenum foils 123 and the composite material layers 106. For example, the consolidating and curing may be carried out via autoclave processing, vacuum bag processing, or another known process. Autoclave processing involves use of an autoclave pressure vessel which provides curing conditions for a composite material, and the application of vacuum, pressure, heat up rate, and cure temperature may be controlled.

The method 300 further comprises step 308 of using the molybdenum composite hybrid laminate 100 or the molybdenum laminate layup 101 or 150 in a composite structure 104 (see FIG. 4), such as an aircraft structure 10 (see FIG. 1).

In another embodiment, the method 300 may further comprise after using the molybdenum composite hybrid laminate 100 in a composite structure 104, coupling the molybdenum composite hybrid laminate 100 to one or more electrical sensor devices 168 (see FIG. 16) in order to drive electrical current 170 (see FIG. 16) through the molybdenum foil layers 122, monitoring any changes in flow of the electrical current 170 through the molybdenum foil layers 122, and obtaining structural health data 254 (see FIG. 16) of the composite structure 104.

As discussed in detail above, in one embodiment, the surface treated molybdenum foil layers 122 used in the method 300 may have a sufficient molybdenum electrical conductivity 128 (see FIG. 4) to enable the surface treated molybdenum foil layers 122 to act as an electrical bus 160 (see FIG. 16) in an aircraft structure 10, resulting in an overall reduced weight of the aircraft structure 10 (see FIG. 1). As discussed in detail above, in another embodiment, the surface treated molybdenum foil layers 122 used in the method 300 may have a sufficient molybdenum strength 126 (see FIG. 4), a sufficient molybdenum stiffness 124 (see FIG. 4), and a sufficient molybdenum electrical conductivity 128 (see FIG. 4) to enable the molybdenum foil layers 122 to act as an aircraft keel beam 240 (see FIG. 15) and current return path 242 dispersing electrical current 184 (see FIG. 15) from a lightning strike 180 (see FIG. 15) to a composite structure 104 (see FIG. 4), such as an aircraft structure 10 (see FIG. 1).

As discussed in detail above, in another embodiment, the surface treated molybdenum foil layers 122 used in the method 300 may have a sufficient molybdenum electrical conductivity 128 (see FIG. 4) and a sufficient molybdenum thermal conductivity 130 (see FIG. 4) to enable the molybdenum foil layers 122 to act as electrical energy dissipation paths 186 (see FIG. 9) improving lightning strike 180 (see FIG. 9) attenuation of a composite structure 104 (see FIG. 4). As discussed in detail above, in another embodiment, the surface treated molybdenum foil layers 122 used in the method 300 may have a sufficient molybdenum melting point 132 (see FIG. 4) and a sufficient molybdenum thermal conductivity 130 (see FIG. 4) that enable the molybdenum foil layers 122 to act as thermal penetration barriers 198 and thermal energy dissipation paths 196 (see FIG. 10) improving thermal impingement resistance of the composite structure 104 (see FIG. 4).

As discussed in detail above, in another embodiment, the surface treated molybdenum foil layers 122 used in the method 300 may have a sufficient molybdenum thermal conductivity 130 (see FIG. 4) to enable the molybdenum foil layers 122 to act as thermal and temperature controllers 226 (see FIG. 13) improving a cure cycle, such as improving cure cycle characteristics, of the composite structure 104 (see FIG. 4). As discussed in detail above, in another embodiment, the surface treated molybdenum foil layers 122 used in the method 300 may have a sufficient molybdenum stiffness 124 (see FIG. 4) and a sufficient molybdenum strength 126 (see FIG. 4) to enable the molybdenum foil layers 122 to act as load dissipation paths 206 (see FIG. 11) improving impact durability of the composite structure 104 (see FIG. 4).

As discussed in detail above, in another embodiment, the surface treated molybdenum foil layers 122 used in the method 300 may have a sufficient molybdenum stiffness 124 (see FIG. 4) and a sufficient molybdenum strength 126 (see FIG. 4) to enable the molybdenum foil layers 122 to act as load steering paths 215 (see FIGS. 12A-12B) to steer load 214 (see FIGS. 12A-12B) around non-load bearing areas 210 (see FIGS. 12A-12B) in the composite structure 104 (see FIGS. 12A-12b). As discussed in detail above, in another embodiment, the surface treated molybdenum foil layers 122 used in the method 300 may have a sufficient molybdenum stiffness 124 (see FIG. 4) and a sufficient molybdenum strength 126 (see FIG. 4) to enable the molybdenum foil layers 122 to act as reinforcement elements 236 (see FIGS. 14A-14B) and load drawing paths 235 (see FIGS. 14A-14B) reinforcing and drawing load 234 (see FIG. 14A) away from a repair area 230 (see FIGS. 14A-14B) in the composite structure 104 (see FIGS. 14A-14B). As discussed in detail above, in another embodiment, the surface treated molybdenum foil layers 122 used in the method 300 may have a sufficient molybdenum stiffness 124 (see FIG. 4) and a sufficient molybdenum strength 126 (see FIG. 4) to enable the molybdenum foil layers 122 to act as fiber stabilizers 270 (see FIG. 18) between a cured composite structure 262 (see FIG. 18) and an uncured composite structure 264 (see FIG. 18).

The method 300 is one embodiment of forming the molybdenum composite hybrid laminate 100 or molybdenum laminate layup 101 disclosed herein. However, the molybdenum composite hybrid laminate 100 or molybdenum laminate layup 101 may be made by any of a number of methods. In the case of thermoplastic composites, it is preferred that the laminates are prepared by successively laying down long continuous strips of thermoplastic resin pre-impregnated fibrous tapes ("prepregs"), by means of a thermoplastic application head, directly onto the treated outer surface of a foil. By laying down strips of tape side-by-side while consolidating these through the application of heat and pressure, a continuous ply of composite with parallel-oriented fibers is produced. Thereafter, another ply or plies of composite may be laid down on top of the first ply, depending upon the properties needed of the laminate. The ply or plies make up a layer of composite. Then, a layer of foil is rolled out over the consolidated composite layer and is bonded, for example heat-fused, onto the composite. Thereafter, a next layer of organic composite is formed on top of the metallic foil by laying down a ply or plies, as described above. Finally, after laying down the predetermined number of layers of metallic foil and organic polymeric matrix, an outer layer of metallic foil is applied. The outer layers of foil protect the underlying organic composite of the hybrid laminates from the environment and attack by fluids. Alternative methods of fabrication are also useful. For example, all layers of the hybrid laminate may be stacked in an autoclave or press, without prefusion of layers, and may then be fused under applied heat and pressure into a unitary laminate.

Figure 20:
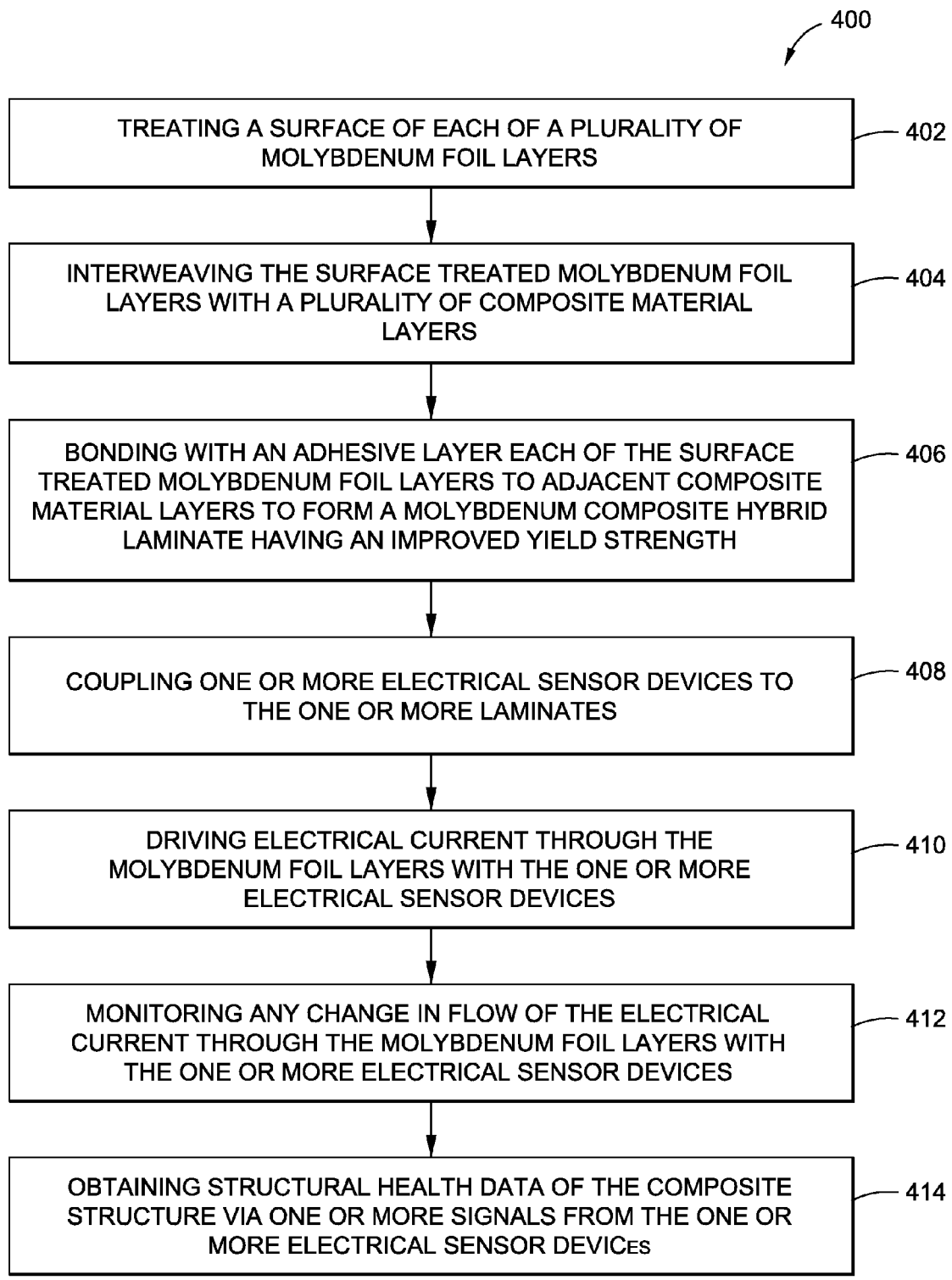
Figure 21:
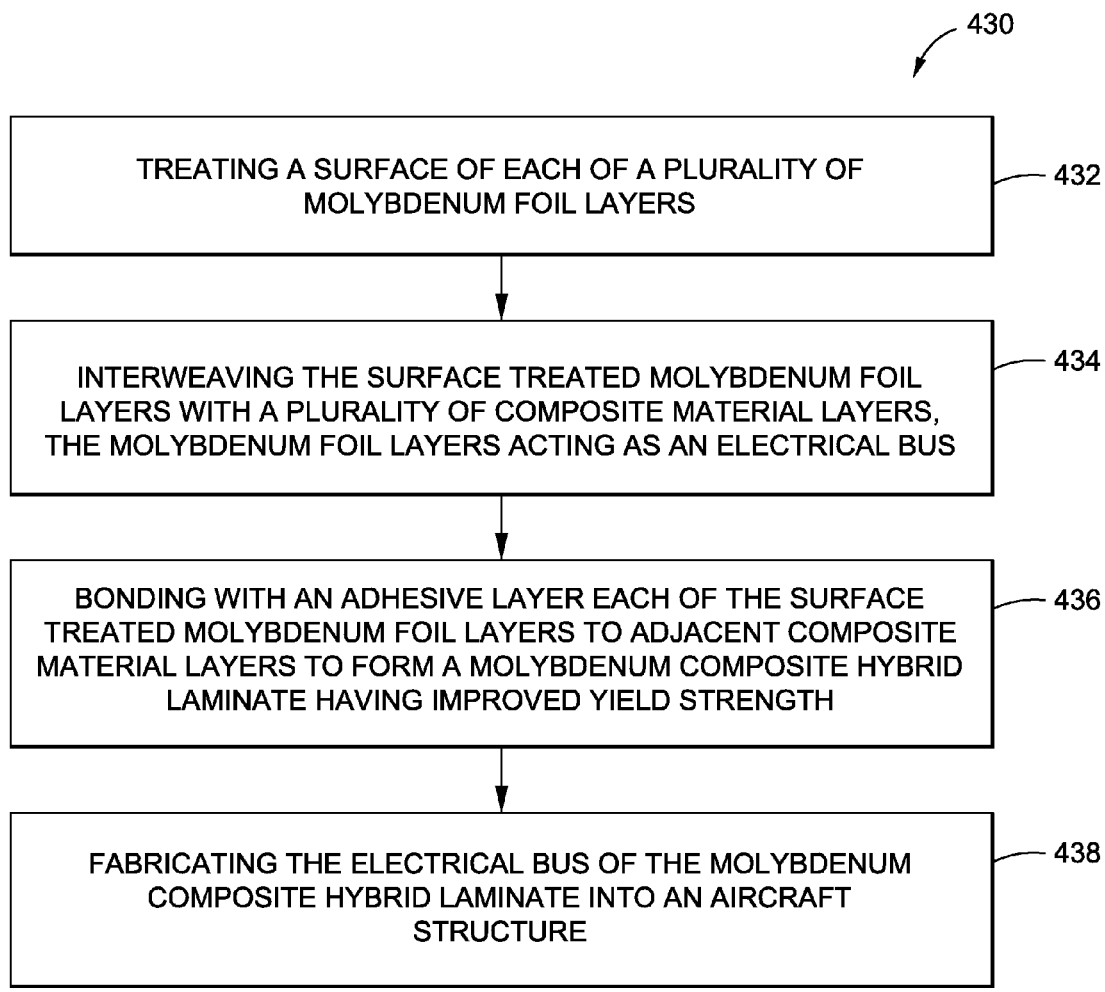

FIG. 20 is a flow diagram illustrating another one of the exemplary embodiments of a method 400 for monitoring the structural health of a composite structure 104, (see FIG. 4) such as an aircraft structure 10 (see FIG. 1), using molybdenum foil layers 122 (see FIG. 4). The method 400 comprises step 402 of treating a surface 125a or 125b (see FIG. 6) of each of a plurality of molybdenum foil layers 122. The molybdenum foil layer 122 is surface treated to improve bonding between the molybdenum foil layer 122 and an adjacent composite material layer 106 (see FIG. 4). The surface 125a or 125b of the molybdenum foil layer 122 may be treated with a surface treatment process comprising sol gel surface treatment, water based sol gel paint, grit blasting, sanding, sandblasting, solvent wiping, abrading, laser ablation, chemical cleaning, chemical etching, or another suitable surface treatment process.

The method 300 further comprises step 404 of interweaving the surface treated molybdenum foil layers 122 with a plurality of composite material layers 106. Preferably, each composite material layer 106 comprises a fiber-reinforced polymeric material 108 (see FIGS. 4, 5). The surface treated molybdenum foil layers 122 have a sufficient molybdenum stiffness 124 (see FIG. 4) to leverage the fiber tensile strength 116 (see FIG. 4) and the fiber stiffness 118 (see FIG. 4) of the off-axis fibers 110 (see FIG. 4) in adjacent composite material layers 106 via Poisson's effects in the surface treated molybdenum foil layers 122. The surface treated molybdenum foil layers 122 are preferably separate from each other and have a sufficient molybdenum electrical conductivity 128 (see FIG. 4) to enable the surface treated molybdenum foil layers 122 to act as an electrical bus 160 (see FIG. 16). The molybdenum composite hybrid laminate 100 further comprises a plurality of adhesive layers 134 disposed between and bonding adjacent layers of the composite material layers 106 and the surface treated molybdenum foil layers 122.

The method 400 further comprises step 406 of bonding with an adhesive layer 134 (see FIG. 16) each of the surface treated molybdenum foil layers 122 to adjacent composite material layers 106 to form the molybdenum composite hybrid laminate 100 having improved yield strength 102 (see FIG. 4). The interweaving step 404 and/or bonding step 406 of the method 400 may further comprise one or more of compacting, consolidating, and curing the interweaved surface treated molybdenum foil layers 122 and the composite material layers 106. For example, the consolidating and curing may be carried out via autoclave processing or another known process.

The method 400 further comprises step 408 of coupling one or more electrical sensor devices 168 (see FIG. 16) to the one or more molybdenum composite hybrid laminates 100. The method 400 further comprises step 410 of driving electrical current 170 (see FIG. 16) through the surface treated molybdenum foil layers 122 with the one or more electrical sensor devices 168. The method 400 further comprises step 412 of monitoring any change in electrical current flow 172 (see FIG. 16) through the surface treated molybdenum foil layers 122 with the one or more electrical sensor devices 168. The method 400 further comprises step 414 of obtaining structural health data 254 (see FIG. 16) of the composite structure 104 via one or more signals 252 (see FIG. 16) from the one or more electrical sensor devices 168. The structural health data 254 may comprise one or more of lightning strike detection, initiation of structural flaws, propagation of structural flaws, potential deterioration, actual deterioration, structural health data detected via full or partial electrical current interruption, or other suitable structural health data.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A molybdenum composite hybrid laminate comprising:
   a plurality of composite material layers;
   a plurality of surface treated molybdenum foil layers interweaved between the composite material layers; and,
   a plurality of adhesive layers disposed between and bonding adjacent layers of the composite material layers and the molybdenum foil layers,
   wherein each of the plurality of surface treated molybdenum foil layers has a sufficient stiffness to leverage a fiber tensile strength and a fiber stiffness of off-axis fibers in adjacent composite material layers via Poisson's effects in each of the plurality of surface treated molybdenum foil layers.

2. The laminate of claim 1, wherein the composite material layer comprises a fiber-reinforced polymeric material.

3. The laminate of claim 1, wherein the laminate is used in a composite structure and improves yield strength in the composite structure.

4. The laminate of claim 3, wherein the composite structure comprises an aircraft composite structure.

5. The laminate of claim 4, wherein the molybdenum foil layers have a sufficient strength, a sufficient stiffness, and a sufficient electrical conductivity to enable the molybdenum foil layers to act as an aircraft keel beam and a current return path for dispersing electrical current from a lightning strike to the aircraft composite structure.

6. The laminate of claim 1, wherein the molybdenum foil layer is surface treated to improve bonding between the molybdenum foil layer and an adjacent composite material layer.

7. The laminate of claim 1, wherein the molybdenum foil layer is surface treated via one or more surface treatments selected from the group comprising sol gel surface treatment, water based sol gel paint, grit blasting, sanding, sandblasting, solvent wiping, abrading, chemical cleaning, laser ablation, and chemical etching.

8. The laminate of claim 1, wherein two or more of the composite material layers each have a cutout portion of surface treated molybdenum foil, and the cutout portions have interior edges that are staggered to prevent an overlay of two or more interior edges in order to provide improved load distribution.

9. The laminate of claim 1, wherein the molybdenum foil layers have a sufficient electrical conductivity to enable the molybdenum foil layers to act as an electrical bus for a composite aircraft structure.

10. The laminate of claim 1, wherein the laminate is coupled to one or more electrical sensor devices that drive electrical current through the molybdenum foil layers and that monitor any changes in flow of the electrical current through the molybdenum foil layers in order to obtain structural health data of a composite structure.

11. The laminate of claim 1, wherein the molybdenum foil layers have a sufficient electrical conductivity and a sufficient thermal conductivity to enable the molybdenum foil layers to act as electrical energy dissipation paths improving lightning attenuation of a composite structure.

12. The laminate of claim 1, wherein the molybdenum foil layers have a sufficient melting point and a sufficient thermal conductivity that enable the molybdenum foil layers to act as thermal penetration barriers and thermal energy dissipation paths improving thermal impingement resistance of a composite structure.

13. The laminate of claim 1, wherein the molybdenum foil layers have a sufficient thermal conductivity to enable the molybdenum foil layers to act as thermal and temperature controllers improving a cure cycle of a composite structure.

14. The laminate of claim 1, wherein the molybdenum foil layers have a sufficient stiffness and a sufficient strength to enable the molybdenum foil layers to act as load dissipation paths improving impact durability of a composite structure.

15. The laminate of claim 1, wherein the molybdenum foil layers have a sufficient stiffness and a sufficient strength to enable the molybdenum foil layers to act as load steering paths steering load around non-load bearing areas in a composite structure.

16. The laminate of claim 1, wherein the molybdenum foil layers have a sufficient stiffness and a sufficient strength to enable the molybdenum foil layers to act as reinforcement elements and load drawing paths to reinforce and draw load away from a repair area in a composite structure.

17. The laminate of claim 1, wherein the molybdenum foil layers have a sufficient stiffness and a sufficient strength to enable the molybdenum foil layers to act as fiber stabilizers mitigating fiber distortion in a composite structure.

18. A molybdenum laminate lay up comprising:
a plurality of composite material layers;
a plurality of molybdenum foil containing layers interweaved between the composite material layers, each molybdenum foil containing layer comprising a composite material layer having a cutout portion of a surface treated molybdenum foil; and,
a plurality of adhesive layers disposed between and bonding adjacent layers of the composite material layers and the molybdenum foil containing layers,
wherein the surface treated molybdenum foil has a sufficient stiffness to leverage a fiber tensile strength and a fiber stiffness of off-axis fibers in adjacent composite material layers via Poisson's effects in the surface treated molybdenum foil.

19. The molybdenum laminate lay up of claim 18, wherein the plurality of molybdenum foil containing layers have cutout portions with interior edges that are staggered to prevent an overlay of two or more interior edges in order to provide improved load distribution by the molybdenum foil.

20. The molybdenum laminate lay up of claim 18, further comprising one or more surface treated molybdenum foil layers adjacent one or more of the composite material layers and molybdenum foil containing layers.

21. The molybdenum laminate lay up of claim 18, wherein no adjacent composite material layer and molybdenum foil containing layer are orientated at a same angle.

22. A system for monitoring structural health of a composite structure, the system comprising:
a composite structure comprising one or more molybdenum composite hybrid laminates, each laminate comprising:
a plurality of composite material layers;
a plurality of surface treated molybdenum foil layers interweaved between the composite material layers; and,
a plurality of adhesive layers disposed between and bonding adjacent layers of the composite material layers and the molybdenum foil layers, and,
one or more electrical sensor devices coupled to the one or more laminates, the sensor devices driving electrical current through the molybdenum foil layers and monitoring any changes in flow of the electrical current through the molybdenum foil layers in order to obtain structural health data of the composite structure via one or more signals from the one or more sensor devices.

23. The system of claim 22, wherein the molybdenum foil layers have a sufficient stiffness to leverage a fiber tensile strength and a fiber stiffness of off-axis fibers in adjacent composite material layers via Poisson's effects in the molybdenum foil layers, the molybdenum foil layers being separate from each other and further having a sufficient electrical conductivity to enable the molybdenum foil layers to act as an electrical bus.

24. The system of claim 22, wherein the structural health data is selected from the group comprising one or more of lightning strike detection, initiation of structural flaws, propagation of structural flaws, potential deterioration, actual deterioration, and structural health data detected via full or partial electrical current interruption.

25. The system of claim 22, wherein the composite structure comprises an aircraft structure.

* * * * *